US012309830B2

(12) United States Patent
Abedini et al.

(10) Patent No.: US 12,309,830 B2
(45) Date of Patent: May 20, 2025

(54) ACCESS PROCEDURE CONFIGURATION OF A MILLIMETER WAVE REPEATER

(71) Applicant: QUALCOMM Incorporated, San Diego, CA (US)

(72) Inventors: Navid Abedini, Basking Ridge, NJ (US); Jianghong Luo, Skillman, NJ (US); Ashwin Sampath, Skillman, NJ (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 17/188,944

(22) Filed: Mar. 1, 2021

(65) Prior Publication Data

US 2021/0298069 A1  Sep. 23, 2021

Related U.S. Application Data

(60) Provisional application No. 62/993,447, filed on Mar. 23, 2020.

(51) Int. Cl.
*H04W 74/00* (2009.01)
*H04L 1/1607* (2023.01)
*H04W 56/00* (2009.01)
*H04W 72/23* (2023.01)
*H04W 74/0833* (2024.01)

(52) U.S. Cl.
CPC ......... *H04W 74/008* (2013.01); *H04L 1/1614* (2013.01); *H04W 56/001* (2013.01); *H04W 72/23* (2023.01); *H04W 74/0833* (2013.01)

(58) Field of Classification Search
CPC . H04W 74/008; H04W 72/23; H04W 56/001; H04L 1/1614
See application file for complete search history.

(56) References Cited

U.S. PATENT DOCUMENTS

| 8,750,196 | B2 | 6/2014 | Chen et al. |
| 10,433,342 | B2 | 10/2019 | Akkarakaran et al. |
| 10,785,705 | B1 | 9/2020 | Rofougaran et al. |
| 11,071,155 | B2 | 7/2021 | Baghel et al. |

(Continued)

FOREIGN PATENT DOCUMENTS

| CN | 109996332 A | 7/2019 |
| CN | 109996333 A | 7/2019 |

(Continued)

OTHER PUBLICATIONS

International Search Report and Written Opinion—PCT/US2021/020523—ISA/EPO—Jun. 28, 2021.

*Primary Examiner* — Christopher M Crutchfield
*Assistant Examiner* — Tito Q Pham
(74) *Attorney, Agent, or Firm* — Harrity & Harrity, LLP

(57) ABSTRACT

Various aspects of the present disclosure generally relate to wireless communication. In some aspects, a repeater may receive configuration information associated with configuring involvement of the repeater in an access procedure; receive a signal associated with the access procedure from a first wireless communication device; and forward the signal associated with the access procedure to a second wireless communication device based at least in part on the configuration information and other information, associated with the access procedure, received by the repeater. Numerous other aspects are provided.

30 Claims, 13 Drawing Sheets

(56) References Cited

U.S. PATENT DOCUMENTS

| | | |
|---|---|---|
| 11,310,771 B2* | 4/2022 | Harada ................ H04W 72/30 |
| 2009/0287979 A1 | 11/2009 | Wang et al. |
| 2010/0150103 A1 | 6/2010 | Womack et al. |
| 2010/0167768 A1 | 7/2010 | Tsutsui |
| 2010/0254295 A1 | 10/2010 | Ahn et al. |
| 2010/0302998 A1 | 12/2010 | Bao et al. |
| 2010/0329216 A1 | 12/2010 | Jen |
| 2011/0110258 A1 | 5/2011 | Ishii et al. |
| 2011/0136525 A1 | 6/2011 | Fujii et al. |
| 2011/0194483 A1 | 8/2011 | Ji et al. |
| 2012/0039299 A1 | 2/2012 | Teyeb et al. |
| 2012/0063369 A1 | 3/2012 | Lin et al. |
| 2012/0213137 A1 | 8/2012 | Jeong et al. |
| 2012/0307717 A1* | 12/2012 | Worrall .............. H04B 7/15557 370/315 |
| 2013/0016649 A1 | 1/2013 | Damnjanovic et al. |
| 2013/0142107 A1 | 6/2013 | Ohta et al. |
| 2013/0223251 A1 | 8/2013 | Li et al. |
| 2013/0286965 A1 | 10/2013 | Xu et al. |
| 2014/0126460 A1 | 5/2014 | Bienas et al. |
| 2016/0183208 A1 | 6/2016 | Lee et al. |
| 2017/0164381 A1 | 6/2017 | Kim et al. |
| 2017/0359766 A1 | 12/2017 | Agiwal et al. |
| 2018/0092139 A1 | 3/2018 | Novlan et al. |
| 2018/0092150 A1 | 3/2018 | Tenny et al. |
| 2018/0110075 A1 | 4/2018 | Ly et al. |
| 2018/0115990 A1 | 4/2018 | Abedini et al. |
| 2018/0220356 A1 | 8/2018 | Tenny et al. |
| 2018/0279380 A1 | 9/2018 | Jung et al. |
| 2019/0007124 A1 | 1/2019 | Seo et al. |
| 2019/0053272 A1 | 2/2019 | Tsai |
| 2019/0124696 A1* | 4/2019 | Islam ................ H04W 92/20 |
| 2019/0132882 A1 | 5/2019 | Li et al. |
| 2019/0140881 A1 | 5/2019 | Akkarakaran et al. |
| 2019/0215759 A1 | 7/2019 | Wei et al. |
| 2019/0215869 A1 | 7/2019 | Lin |
| 2019/0222290 A1 | 7/2019 | Ly et al. |
| 2019/0260459 A1* | 8/2019 | Jeon ................ H04B 7/04 |
| 2019/0327764 A1 | 10/2019 | Yoo et al. |
| 2019/0349060 A1 | 11/2019 | Liao et al. |
| 2020/0059292 A1 | 2/2020 | Kim et al. |
| 2020/0106582 A1 | 4/2020 | Jalali |
| 2020/0107362 A1 | 4/2020 | Qi et al. |
| 2020/0107372 A1 | 4/2020 | Agiwal et al. |
| 2020/0145860 A1 | 5/2020 | Koskela et al. |
| 2020/0196225 A1* | 6/2020 | Wang ................ H04W 76/11 |
| 2020/0196383 A1 | 6/2020 | Tsai et al. |
| 2020/0274609 A1 | 8/2020 | Youtz et al. |
| 2020/0287605 A1 | 9/2020 | Mizusawa |
| 2020/0288535 A1* | 9/2020 | Sharma ............ H04W 36/0033 |
| 2020/0304255 A1* | 9/2020 | Wu ................ H04B 7/155 |
| 2020/0313755 A1 | 10/2020 | Chuang et al. |
| 2020/0322919 A1 | 10/2020 | Wu |
| 2020/0337115 A1* | 10/2020 | Qin ................ H04W 72/21 |
| 2020/0367146 A1 | 11/2020 | Sharma et al. |
| 2020/0403689 A1 | 12/2020 | Rofougaran et al. |
| 2020/0412519 A1 | 12/2020 | Krishnaswamy et al. |
| 2021/0036762 A1 | 2/2021 | Abedini et al. |
| 2021/0036764 A1 | 2/2021 | Li et al. |
| 2021/0037486 A1 | 2/2021 | Li et al. |
| 2021/0037601 A1 | 2/2021 | Xu et al. |
| 2021/0075474 A1 | 3/2021 | Raghavan et al. |
| 2021/0112598 A1* | 4/2021 | Ryu ................ H04W 74/002 |
| 2021/0168880 A1* | 6/2021 | Ohara ................ H04W 74/008 |
| 2021/0185723 A1 | 6/2021 | Abedini et al. |
| 2021/0242916 A1* | 8/2021 | Lomayev .......... H04B 7/15557 |
| 2022/0070809 A1* | 3/2022 | Song ................ H04W 72/0446 |
| 2022/0104153 A1* | 3/2022 | Ko ................ H04W 48/10 |
| 2022/0132576 A1* | 4/2022 | Maeder ............. H04W 74/006 |
| 2022/0247474 A1 | 8/2022 | Rune et al. |
| 2022/0248305 A1 | 8/2022 | Rofougaran et al. |
| 2023/0100704 A1 | 3/2023 | Raghavan et al. |
| 2023/0362984 A1 | 11/2023 | Abedini et al. |
| 2024/0413888 A1 | 12/2024 | Abedini et al. |

FOREIGN PATENT DOCUMENTS

| | | |
|---|---|---|
| EP | 3451725 A1 | 3/2019 |
| EP | 3720204 A1 | 10/2020 |
| WO | 2012037025 A1 | 3/2012 |
| WO | 2017052569 A1 | 3/2017 |
| WO | 2017127159 | 7/2017 |
| WO | 2017169199 A1 | 10/2017 |
| WO | 2018075256 | 4/2018 |
| WO | 2018075534 | 4/2018 |
| WO | 2018203727 A1 | 11/2018 |
| WO | 2019134615 A1 | 7/2019 |
| WO | 2019134617 A1 | 7/2019 |
| WO | 2019194574 A1 | 10/2019 |

* cited by examiner

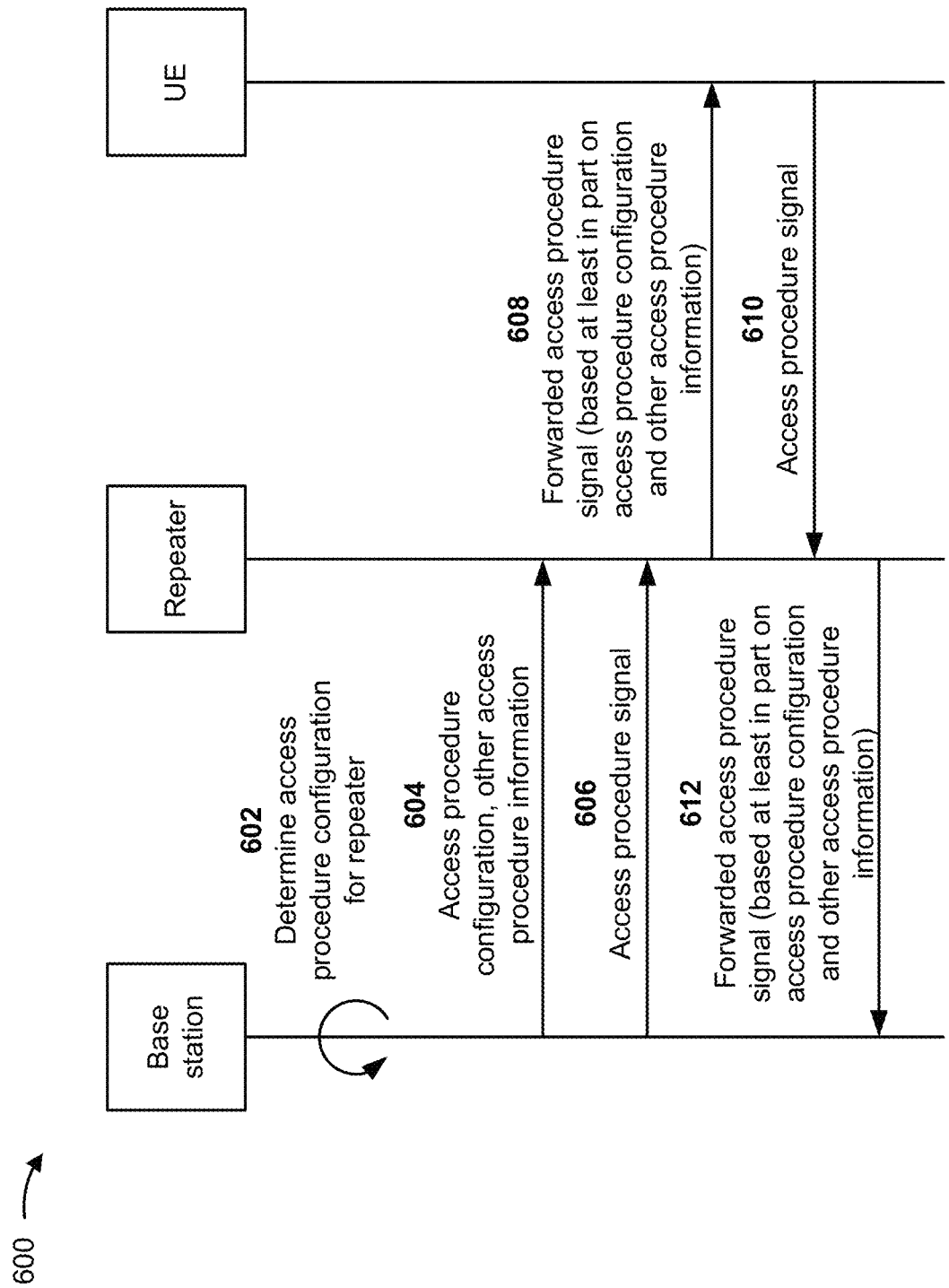

ACCESS PROCEDURE CONFIGURATION OF A MILLIMETER WAVE REPEATER

CROSS-REFERENCE TO RELATED APPLICATION

This Patent application claims priority to U.S. Provisional Patent Application No. 62/993,447, filed on Mar. 23, 2020, entitled "ACCESS PROCEDURE CONFIGURATION OF A MILLIMETER WAVE REPEATER," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for access procedure configuration of a millimeter wave (mmW) repeater.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a repeater, may include receiving configuration information associated with configuring involvement of the repeater in an access procedure; receiving a signal associated with the access procedure from a first wireless communication device; and forwarding the signal associated with the access procedure to a second wireless communication device based at least in part on the configuration information and other information, associated with the access procedure, received by the repeater.

In some aspects, a method of wireless communication, performed by a base station, may include determining configuration information associated with configuring involvement of a repeater in an access procedure when forwarding a signal, received from a first wireless communication device, to a second wireless communication device; and transmitting the configuration information associated with configuring involvement of the repeater in the access procedure and other information associated with the access procedure to the repeater.

In some aspects, a repeater for wireless communication may include a memory and one or more processors operatively coupled to the memory. The memory and the one or more processors may be configured to receive configuration information associated with configuring involvement of the repeater in an access procedure; receive a signal associated with the access procedure from a first wireless communication device; and forward the signal associated with the access procedure to a second wireless communication device based at least in part on the configuration information and other information, associated with the access procedure, received by the repeater.

In some aspects, a base station for wireless communication may include a memory and one or more processors operatively coupled to the memory. The memory and the one or more processors may be configured to determine configuration information associated with configuring involvement of a repeater in an access procedure when forwarding a signal, received from a first wireless communication device, to a second wireless communication device; and transmit the configuration information associated with configuring involvement of the repeater in the access procedure and other information associated with the access procedure to the repeater.

In some aspects, a non-transitory computer-readable medium may store one or more instructions for wireless communication. The one or more instructions, when executed by one or more processors of a repeater, may cause the one or more processors to receive configuration information associated with configuring involvement of the repeater in an access procedure; receive a signal associated with the access procedure from a first wireless communication device; and forward the signal associated with the access procedure to a second wireless communication device based at least in part on the configuration information and other information, associated with the access procedure, received by the repeater.

In some aspects, a non-transitory computer-readable medium may store one or more instructions for wireless communication. The one or more instructions, when executed by one or more processors of a base station, may cause the one or more processors to determine configuration information associated with configuring involvement of a repeater in an access procedure when forwarding a signal, received from a first wireless communication device, to a second wireless communication device; and transmit the configuration information associated with configuring involvement of the repeater in the access procedure and other information associated with the access procedure to the repeater.

In some aspects, an apparatus for wireless communication may include means for receiving configuration information associated with configuring involvement of the apparatus in an access procedure; means for receiving a signal associated with the access procedure from a first wireless communication device; and means for forwarding the signal associated with the access procedure to a second wireless communication device based at least in part on the configuration information and other information, associated with the access procedure, received by the repeater.

In some aspects, an apparatus for wireless communication may include means for determining configuration information associated with configuring involvement of a repeater in an access procedure when forwarding a signal, received from a first wireless communication device, to a second wireless communication device; and means for transmitting the configuration information associated with configuring involvement of the repeater in the access procedure and other information associated with the access procedure to the repeater.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example associated with access procedure configuration of a mmW repeater, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
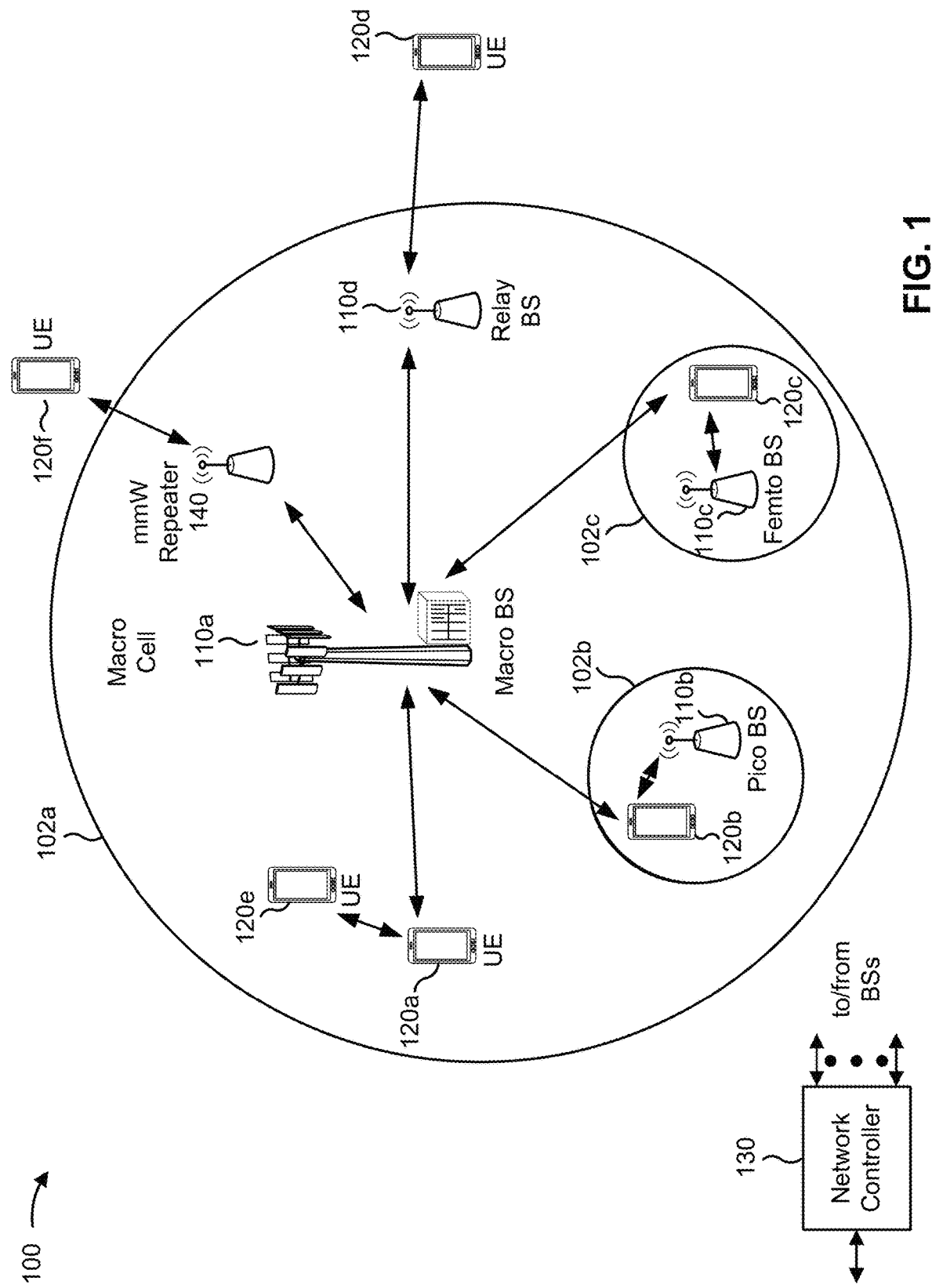
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

In some aspects, millimeter wave (mmW) repeater 140 (sometimes referred to herein as a repeater 140) may receive an analog millimeter wave signal from a base station 110, may amplify the analog millimeter wave signal, and may transmit the amplified millimeter wave signal to one or more UEs 120 (e.g., shown as UE 120f). In some aspects, the mmW repeater 140 may be an analog mmW repeater, sometimes also referred to as a layer-1 mmW repeater. Additionally, or alternatively, the mmW repeater 140 may be a wireless TRP acting as a distributed unit (e.g., of a 5G access node) that communicates wirelessly with a base station 110 acting as a central unit or an access node controller (e.g., of the 5G access node). The mmW repeater may receive, amplify, and transmit the analog mmW signal without performing analog-to-digital conversion of the analog mmW signal and/or without performing any digital signal processing on the mmW signal. In this way, latency may be reduced and a cost to produce the mmW repeater 140 may be reduced. Additional details regarding mmW repeater 140 are provided elsewhere herein.

In some aspects, a base station 110 may determine configuration information associated with configuring involvement of a mmW repeater 140 in an access procedure when forwarding a signal, and may transmit the configuration information associated with configuring involvement of the mmW repeater 140 in the access procedure, as described herein. In some aspects, the mmW repeater 140 may receive the configuration information associated with configuring involvement of the mmW repeater 140 in the access procedure, and may receive and forward a signal, associated with the access procedure, based at least in part on the configuration information, as described herein.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHZ, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHZ, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
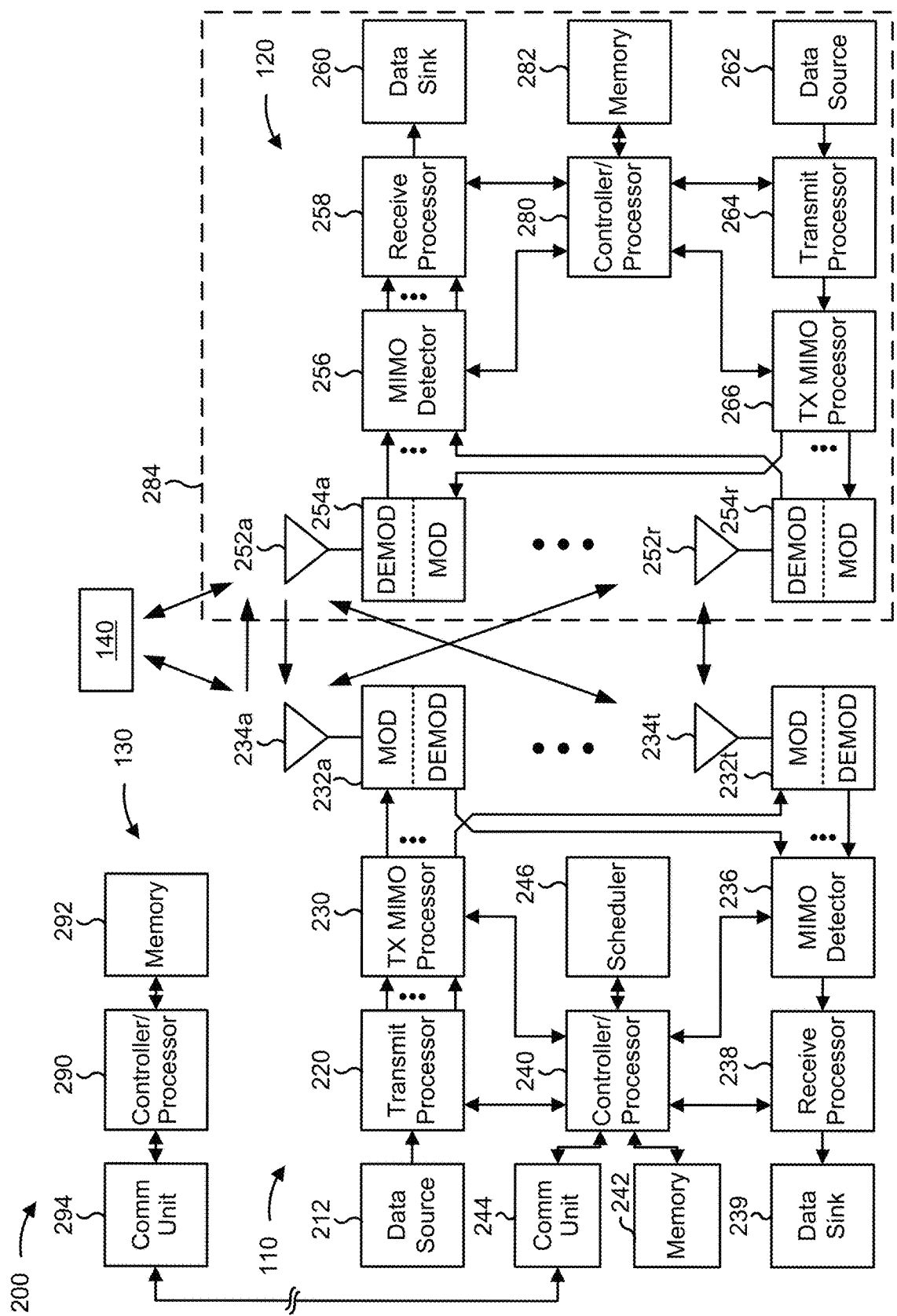
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6-8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6-8.

Controller/processor 240 of base station 110, controller/processor 280 of UE 120, and/or any other component(s) of FIG. 2 may perform one or more techniques associated with access procedure configuration of a mmW repeater, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8 and/or other processes as described herein. In some aspects, executing instructions may include running the instructions, converting the instructions, compiling the instructions, and/or interpreting the instructions, among other examples.

In some aspects, base station 110 may include means for determining configuration information associated with configuring involvement of a mmW repeater 140 in an access procedure when forwarding a signal, received from a first wireless communication device (e.g., a base station 110, a UE 120, or the like), to a second wireless communication device (e.g., the UE 120, the base station 110, or the like); means for transmitting the configuration information associated with configuring involvement of the mmW repeater 140 in the access procedure and other information associated with the access procedure to the repeater; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
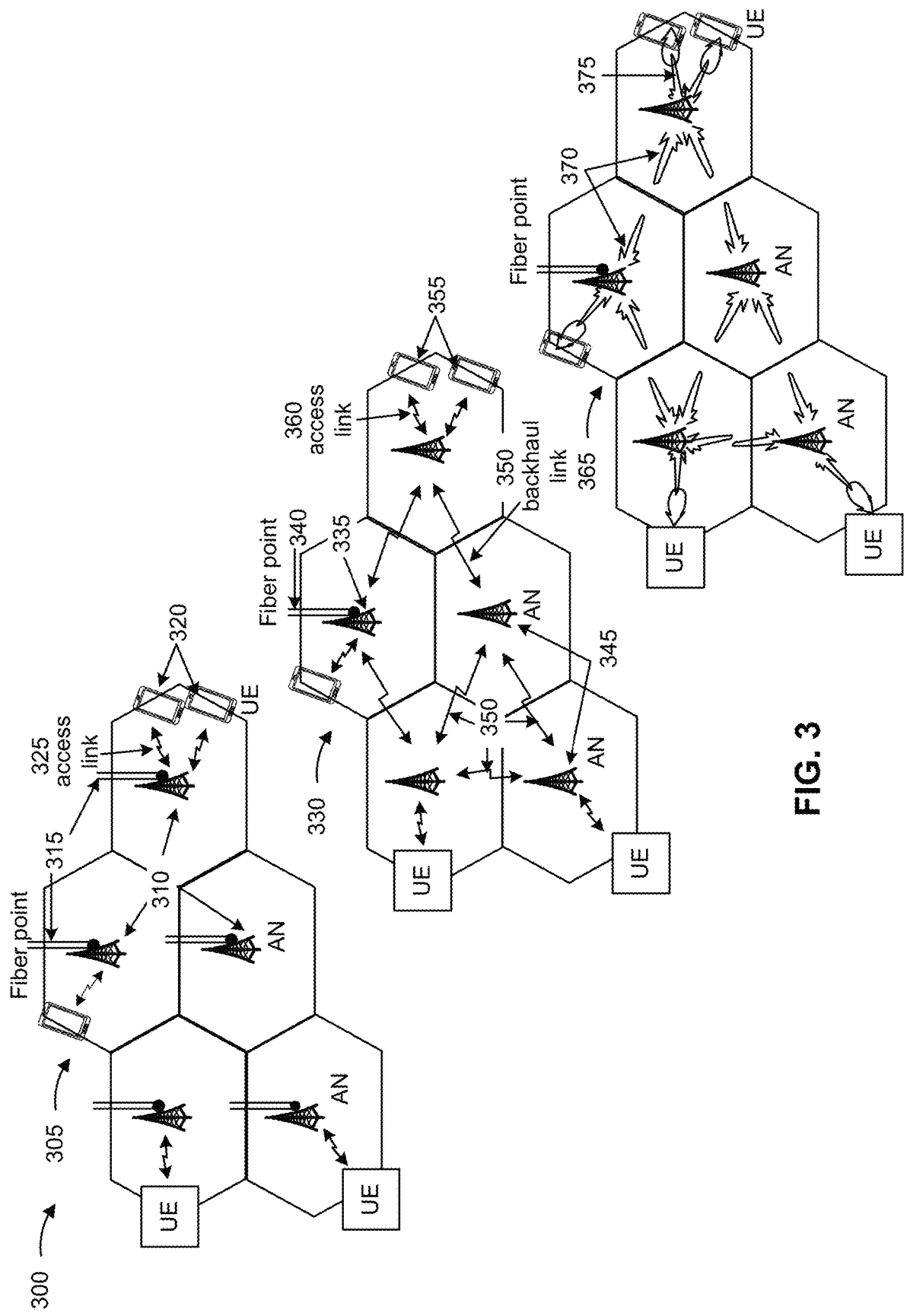
FIG. 3 is a diagram illustrating examples of radio access networks, in accordance with the present disclosure.

FIG. 3 is a diagram illustrating examples 300 of radio access networks, in accordance with the present disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may correspond to a base station 110 shown in FIG. 1. Similarly, a UE 320 shown in FIG. 3 may correspond to a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly with or indirectly with (e.g., via one or more non-anchor base stations 345) the anchor base station 335 via one or more backhaul links 350 to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may correspond to a base station 110 shown in FIG. 1. Similarly, a UE 355 shown in FIG. 3 may correspond to a UE 120 shown in FIG. 1.

As shown by reference number 365, in some aspects, a radio access network that includes an IAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links 370 between base stations may use millimeter waves to carry information and/or may be directed toward a target base station using beamforming, precoding, and/or the like. Similarly, the wireless access links 375 between a UE and a base station may use millimeter waves and/or may be directed toward a target wireless node (e.g., a UE and/or a base station). In this way, inter-link interference may be reduced.

In some aspects, an IAB network may support a multi-hop wireless backhaul. Additionally, or alternatively, nodes of an IAB network may use the same radio access technology (e.g., 5G/NR). Additionally, or alternatively, nodes of an IAB network may share resources for access links and backhaul links, such as time resources, frequency resources, spatial resources, and/or the like. Furthermore, various architectures of IAB nodes and/or IAB donors may be supported.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network, a device-to-device network, and/or the like). In this case, an anchor node may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
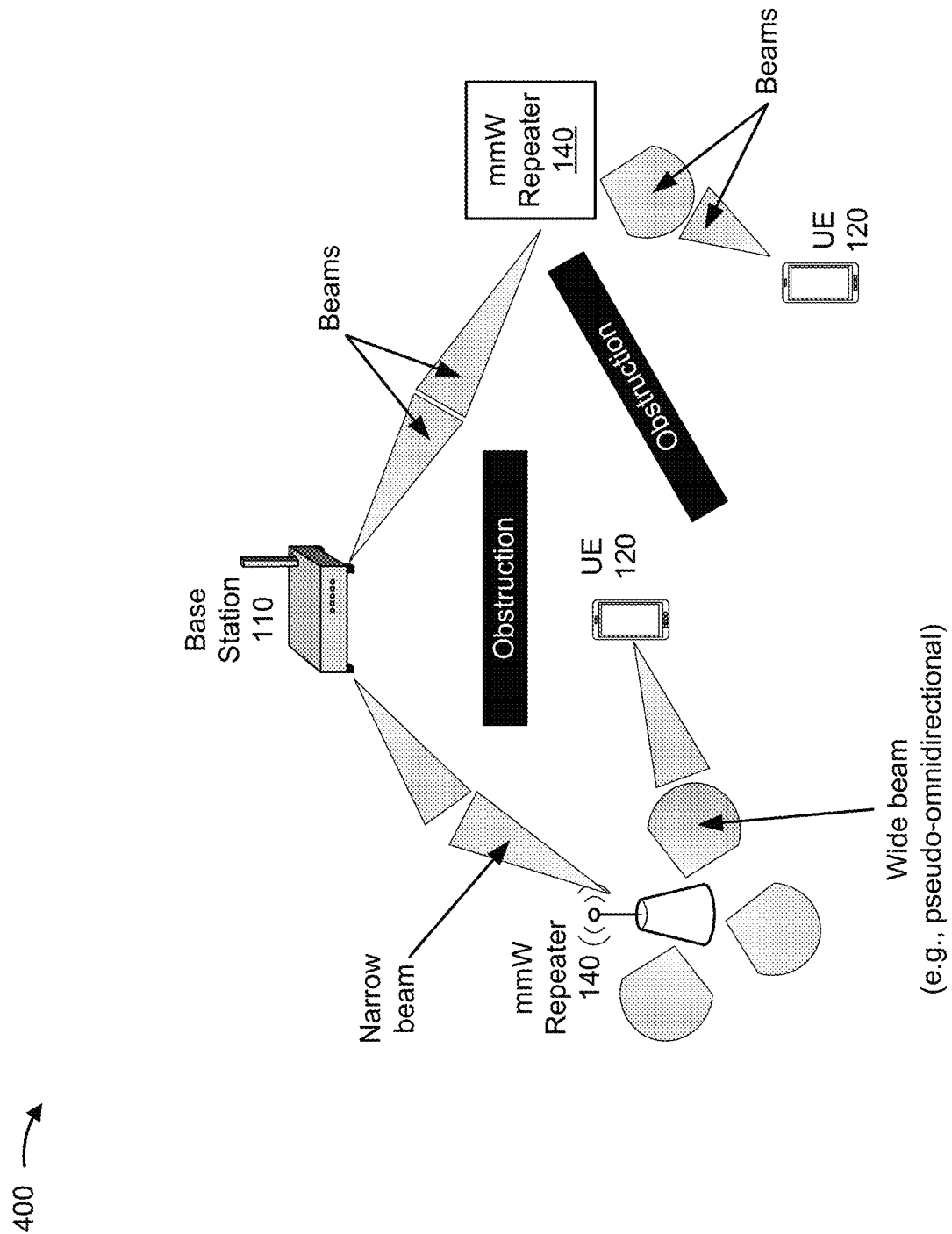
FIG. 4 is a diagram illustrating an example of communicating using a millimeter wave repeater, in accordance with the present disclosure.

FIG. 4 is a diagram illustrating an example 400 of communicating using an analog millimeter wave repeater, in accordance with the present disclosure.

Because millimeter wave communications have a higher frequency and shorter wavelength than other types of radio waves used for communications (e.g., sub-6 GHz communications), millimeter wave communications may have shorter propagation distances and may be more easily blocked by obstructions than other types of radio waves. For example, a wireless communication that uses sub-6 GHz radio waves may be capable of penetrating a wall of a building or a structure to provide coverage to an area on an opposite side of the wall from a base station 110 that communicates using the sub-6 GHz radio waves. However, a millimeter wave may not be capable of penetrating the same wall (e.g., depending on a thickness of the wall, a material from which the wall is constructed, and/or the like). Some techniques and apparatuses described herein use a millimeter wave repeater 140 to increase the coverage area of a base station 110, to extend coverage to UEs 120 without line of sight to the base station 110 (e.g., due to an obstruction), and/or the like. Furthermore, the millimeter wave repeater 140 described herein may be a layer 1 or an analog millimeter wave repeater, which is associated with a lower cost, less processing, and lower latency than a layer 2 or layer 3 repeater.

As shown in FIG. 4, a millimeter wave repeater 140 may perform directional communication by using beamforming to communicate with a base station 110 via a first beam (e.g., a backhaul beam over a backhaul link with the base station 110) and to communicate with a UE 120 via a second beam (e.g., an access beam over an access link with the UE 120). To achieve long propagation distances and/or to satisfy a required link budget, the millimeter wave repeater may use narrow beams (e.g., with a beam width less than a threshold) for such communications.

However, using a narrower beam requires the use of more resources of the millimeter wave repeater 140 (e.g., processing resources, memory resources, power, battery power, and/or the like) and more network resources (e.g., time resources, frequency resources, spatial resources, and/or the like), as compared to a wider beam, to perform beam training (e.g., to determine a suitable beam), beam maintenance (e.g., to find a suitable beam as conditions change due to mobility and/or the like), beam management, and/or the like. This may waste resources of the millimeter wave repeater 140 and/or network resources as compared to using a wider beam, and may lead to increased cost of production of millimeter wave repeaters 140, which may be deployed extensively throughout a radio access network.

For example, a millimeter wave repeater 140 may be deployed in a fixed location with limited or no mobility, similar to a base station 110. As shown in FIG. 4, the millimeter wave repeater 140 may use a narrower beam to communicate with the base station 110 without unnecessarily consuming network resources and/or resources of the millimeter wave repeater 140 because the need for beam training, beam maintenance, and/or beam management may be limited, due to limited or no mobility of the base station 110 and the millimeter wave repeater 140 (and/or due to a line of sight communication path between the base station 110 and the millimeter wave repeater 140).

As further shown in FIG. 4, the millimeter wave repeater 140 may use a wider beam (e.g., a pseudo-omnidirectional beam and/or the like) to communicate with one or more UEs 120. This wider beam may provide wider coverage for access links, thereby providing coverage to mobile UEs 120 without requiring frequent beam training, beam maintenance, and/or beam management. In this way, network resources and/or resources of the millimeter wave repeater 140 may be conserved. Furthermore, if the millimeter wave repeater 140 does not include digital signal processing capabilities, resources of the base station 110 (e.g., processing resources, memory resources, and/or the like) may be conserved that would otherwise be used to perform such signal processing for the millimeter wave repeater 140, and network resources may be conserved that would otherwise be used to communicate input to or output of such processing between the base station 110 and the millimeter wave repeater 140.

In this way, the millimeter wave repeater 140 may increase a coverage area, provide access around obstructions (as shown), and/or the like, while conserving resources of the base station 110, resources of the millimeter wave repeater 140, network resources, and/or the like. Additional details are described below.

As indicated above, FIG. 4 is provided as an example. Other examples may differ from what is described with regard to FIG. 4.

Figure 5A:
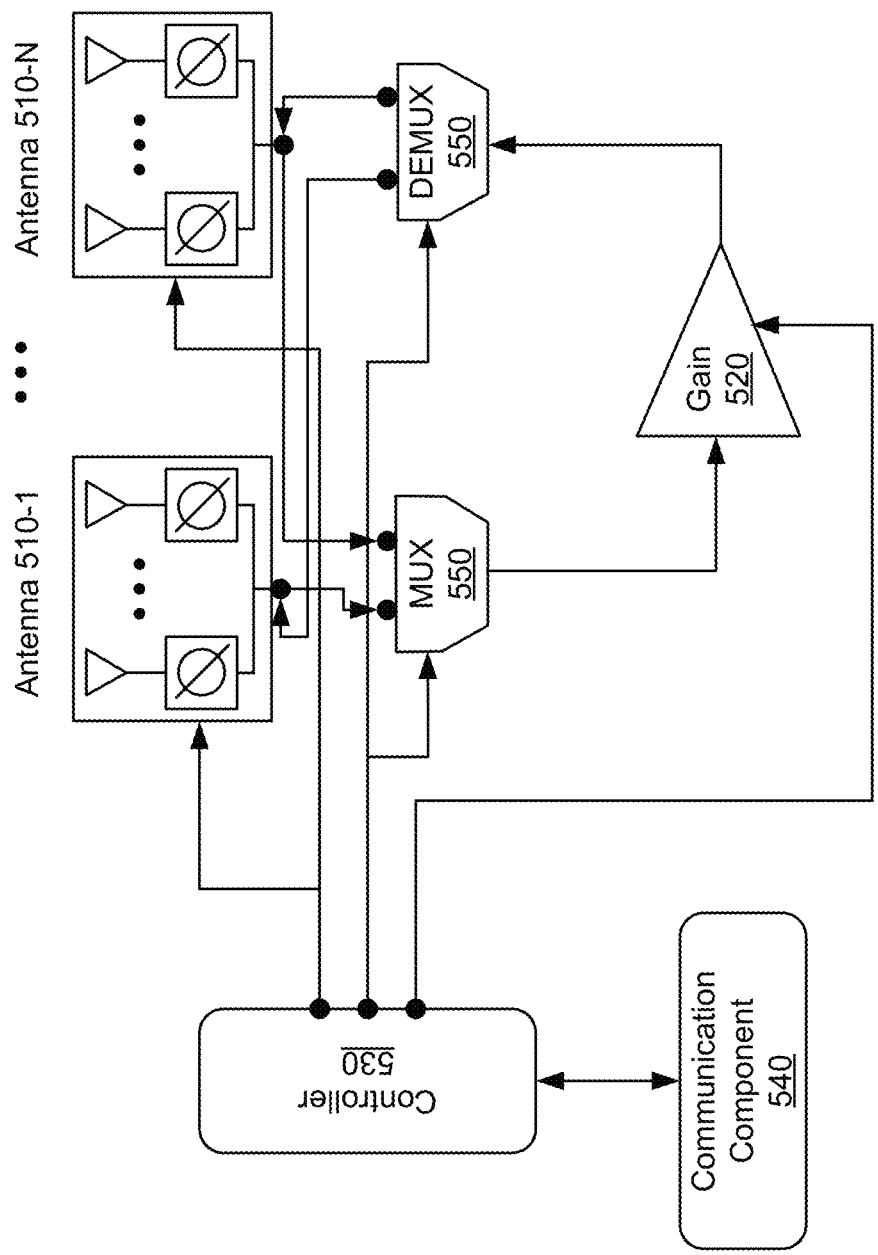
FIGS. 5A and 5B are diagrams illustrating example millimeter wave (mmW) repeaters, in accordance with the present disclosure.
Figure 5B:
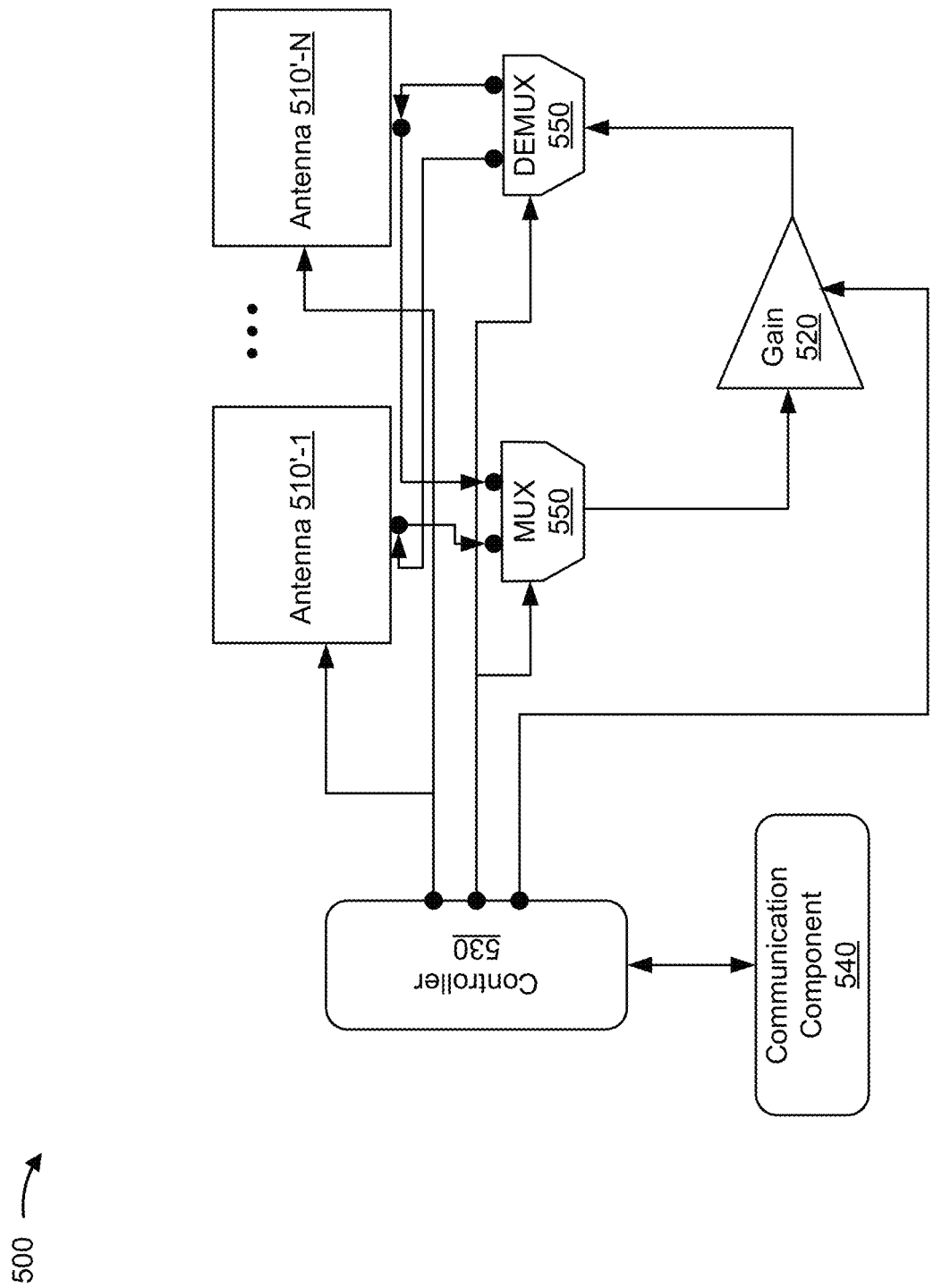

FIGS. 5A and 5B are diagrams illustrating examples of a millimeter wave repeater 500, in accordance with the present disclosure. In some aspects, millimeter wave repeater 500 may correspond to millimeter wave repeater 140 shown in FIG. 1.

As shown in FIG. 5A, in some aspects, the millimeter wave repeater 500 may include one or more phased array antennas 510-1 through 510-N(N≥1), a gain component 520, a controller 530, a communication component 540, and a multiplexer (MUX) and/or demultiplexer (DEMUX) (MUX/DEMUX) 550.

As shown in FIG. 5B, in some aspects, the millimeter wave repeater 500 may include one or more metamaterial antennas 510'-1 through 510'-N, gain component 520, controller 530, communication component 540, and one or more MUX/DEMUX 550.

An antenna 510/510' includes one or more antenna elements capable of being configured for beamforming. In some aspects, as illustrated in FIG. 5A, millimeter wave repeater 500 may include one or more phased array antennas 510, which may be referred to as a phased array because phase values and/or phase offsets of the antenna elements may be configured to form a beam, with different phase values and/or phase offsets being used for different beams (e.g., in different directions).

In some aspects, as illustrated in FIG. 5B, millimeter wave repeater 500 may include one or more metamaterial antennas 510'. In some aspects, a metamaterial antenna may comprise a synthetic material with negative permittivity and/or permeability, which yields a negative refractive index. Due to the resulting superior antenna gain and electro-magnetic lensing, the metamaterial antenna may not need to be used in a phased-array configuration. However, if in a phased-array configuration, antenna spacing may be less than a typically used spacing of lambda/2, where lambda refers to a wavelength of the RF carrier signal. In some aspects, due to superior beamforming, the metamaterial antenna may reduce leakage back to the receive (RX) antenna and may reduce a chance of instability in the RF chain. Hence, the use of metamaterial antennas may reduce or obviate a need for a feedback path.

In some aspects, an antenna 510/510' may be a fixed RX antenna capable of only receiving communications, and not transmitting communications. In some aspects, an antenna 510/510' may be a fixed TX antenna capable of only transmitting communications, and not receiving communications. In some aspects, an antenna 510/510' may be capable of being configured to act as an RX antenna or a TX antenna (e.g., via a TX/RX switch, a MUX/DEMUX, and/or the like). The antennas 510/510' may be capable of communicating using millimeter waves.

Gain component 520 includes a component capable of amplifying an input signal and outputting an amplified signal. For example, gain component 520 may include a power amplifier, a variable gain component, and/or the like.

In some aspects, gain component 520 may have variable gain control. The gain component 520 may connect to an RX antenna (e.g., a first antenna 510/510'-1) and a TX antenna (e.g., a second antenna 510/510'-2) such that an analog millimeter wave signal, received via the RX antenna, can be amplified by the gain component 520 and output to the TX antenna for transmission. In some aspects, the level of amplification of the gain component 520 may be controlled by the controller 530.

Controller 530 includes a component capable of controlling one or more other components of the millimeter wave repeater 500. For example, the controller 530 may include a controller, a microcontroller, a processor, and/or the like. In some aspects, the controller 530 may control the gain component 520 by controlling a level of amplification or gain applied by the gain component 520 to an input signal. Additionally, or alternatively, the controller 530 may control an antenna 510/510' by controlling a beamforming configuration for the antenna 510/510' (e.g., one or more phase values for the antenna 510/510', one or more phase offsets for the antenna 510/510', one or more power parameters for the antenna 510/510', one or more beamforming parameters for the antenna 510/510', a TX beamforming configuration, an RX beamforming configuration, and/or the like), by controlling whether the antenna 510/510' acts as an RX antenna or a TX antenna (e.g., by configuring interaction and/or connections between the antenna 510/510' and a MUX/DEMUX 550), and/or the like. Additionally, or alternatively, the controller 530 may power on or power off one or more components of millimeter wave repeater 500 (e.g., when a base station 110 does not need to use the millimeter wave repeater to serve UEs 120). In some aspects, the controller 530 may control a timing of one or more of the above configurations.

Communication component 540 may include a component capable of wirelessly communicating with a base station 110 using a wireless technology other than millimeter wave. For example, the communication component 540 may communicate with the base station 110 using a personal area network (PAN) technology (e.g., Bluetooth, Bluetooth Low Energy (BLE), and/or the like), a 4G or LTE radio access technology, a narrowband Internet of Things (NB-IoT) technology, a visible light communication technology, and/or the like. In general, the communication component 540 enables communication (e.g., with base station 110) via a low frequency (LF) interface (e.g., an interface that uses a sub-6 GHz frequency). In some aspects, the communication component 540 may use a low frequency communication technology, and an antenna 510/510' may use a higher frequency (HF) communication technology (e.g., millimeter wave and/or the like). In some aspects, an antenna 510/510' may be used to transfer data between the millimeter wave repeater 500 and the base station 110, and the communication component 540 may be used to transfer control information between the millimeter wave repeater 500 and the base station 110 (e.g., a report, a configuration, instructions to power on or power off one or more components, and/or the like).

MUX/DEMUX 550 may be used to multiplex and/or demultiplex communications received from and/or transmitted to an antenna 510/510'. For example, MUX/DEMUX 550 may be used to switch an RX antenna to a TX antenna.

In some aspects, the millimeter wave repeater 500 does not include any components for digital signal processing. For example, the millimeter wave repeater 500 may not include a digital signal processor, a baseband processor, a digital-to-analog converter (DAC), an analog-to-digital converter (ADC), and/or the like. In this way, a cost to produce the millimeter wave repeater 500 may be reduced. Furthermore, latency may be reduced by eliminating digital processing of received millimeter wave signals prior to transmission of corresponding amplified millimeter wave signals.

In some aspects, one or more antennas 510/510', gain component 520, controller 530, communication component 540, MUX/DEMUX 550, and/or the like may perform one or more operations associated with access procedure configuration of a mmW repeater, as described in more detail elsewhere herein. For example, one or more components of millimeter wave repeater 500 may perform or direct operations of, for example, process 700 of FIG. 7 and/or other processes as described herein.

In some aspects, millimeter wave repeater 500 may include means for receiving configuration information associated with configuring involvement of the mmW repeater 500 in an access procedure; means for receiving a signal associated with the access procedure from a first wireless communication device (e.g., a base station 110, a UE 120, or the like); means for forwarding the signal associated with the access procedure to a second wireless communication device (e.g., the UE 120, the base station, or the like) based at least in part on the configuration information and other information, associated with the access procedure, received by the mmW repeater 500; and/or the like. In some aspects, such means may include one or more components of millimeter wave repeater 500 described in connection with FIGS. 5A and 5B.

As indicated above, FIGS. 5A and 5B are provided as an example. Other examples may differ from what is described with regard to FIGS. 5A and 5B. For example, millimeter wave repeater 500 may include additional components, fewer components, different components, or differently arranged components than those shown in FIGS. 5A and 5B. Furthermore, two or more components shown in FIGS. 5A and 5B may be implemented within a single component, or a single component shown in FIGS. 5A and 5B may be implemented as multiple components. Additionally, or alternatively, a set of components (e.g., one or more components) of millimeter wave repeater 500 may perform one or more functions described as being performed by another set of components of millimeter wave repeater 500.

In a wireless communication system, a backhaul link may be established between a base station (e.g., a base station 110) and a repeater (e.g., a mmW repeater 140). The backhaul link can be used, for example, as a control path for carrying signals (e.g., uplink signals and/or downlink signals) associated with configuring the repeater. A repeater capable for which operation can be configured in such a way can also be referred to as a smart repeater or a hybrid node. In some cases, the backhaul link may use a relatively small bandwidth part in the mmW frequency range (e.g., in FR2) and may achieve a relatively low data rate. Further, an access link may be established between the base station and a UE (e.g., UE 120), with the repeater being configured to act as a relay between the base station and the UE (e.g., such that the repeater receives and forwards signals on the access link). The access link can be used, for example, as a data path for carrying signals (e.g., uplink signals and/or downlink signals) between the base station and the UE. In some cases, the access link may use a relatively larger bandwidth in the mmW frequency range and may achieve a relatively high data rate. In some deployments, signals on the backhaul link can be multiplexed (e.g., frequency domain multiplexed (FDM)) with signals on the access link.

Operation of the repeater with respect to the access link can be configured via the backhaul link. That is, operation of the repeater in association with receiving and forwarding signals on the access link can be configured via the backhaul link. For example, the backhaul link can be used to configure the repeater with a beamforming configuration to be used on the access link (e.g., a configuration indicating one or more beams to be used for receiving or forwarding a signal), a switching configuration to be used on the access link (e.g., a configuration indicating whether the repeater is to receive and forward signals on the downlink or the uplink), and a schedule to be used on the access link (e.g., an indication of time resources in which to adopt the beamforming and switching configurations). Additional examples of configurations that may be provided via the backhaul link include a transmit power configuration for the access link (e.g., a configuration indicating a transmit power to be used when forwarding a signal) and an on-off configuration to be used on the access link (e.g., a configuration indicating whether the repeater is to forward signals or refrain from forwarding signals).

In some cases, such configurations of the repeater can be provided using a control signal on the backhaul link. For example, a downlink control information (DCI) format may be defined to enable information associated with one or more of the above configurations to be provided. In some cases, such a control signal may be a common-purpose control signal (e.g., a DCI) that can be used to configure (e.g., dynamically and/or semi-statically) operation of the repeater in a set of upcoming resources. In general, a common-purpose control signal can be used for configuring operation of the repeater as related to any procedure associated with the access link. For example, a common-purpose control signal may be used to configure the repeater for receiving and forwarding cell-specific or broadcast communications (e.g., synchronization signal blocks (SSBs), remaining minimum system information (RMSI), random access channel (RACH) related messages, and/or the like) on the uplink or the downlink. As another example, a common-purpose control signal may be used to configure the repeater for receiving and forwarding UE-specific uplink and downlink communications (e.g., semi-statically scheduled communications, dynamically scheduled communications, one-time communications, periodic communications, semi-persistent communications, or the like).

As a particular example, common-purpose control signals can be used to configure the repeater for operation as related to an initial access procedure associated with the access link. From the perspective of a base station, an initial access procedure includes periodically transmitting one or more SSBs and, for each SSB, periodically transmitting physical downlink control channels (PDCCHs) scheduling RMSI, transmitting physical downlink shared channel (PDSCHs) carrying the scheduled RMSI, and having RACH occasions for receiving RACH messages (e.g., RACH preambles). Here, to extend coverage of the initial access procedure, the base station may need to configure the repeater to receive and forward at least a subset of the SSBs, RMSI PDCCH/PDSCH, and RACH messages associated with the initial access procedure. The base station may use common-purpose control signals to configure the repeater operation on resources associated with these signals related to the initial access procedure. However, configuration of the repeater using common-purpose control signals may result in an undesirable amount of signaling overhead and/or inefficient resource usage (e.g., due to the number of common-purpose control signals needed and/or the amount of information to be conveyed in the common-purpose control signals).

Some aspects described herein provide techniques and apparatuses for access procedure configuration of a repeater (e.g., a mmW repeater 140). In some aspects, as described below, information that is available to the repeater (e.g., information previously received by the repeater) may be leveraged to simplify configuration of the repeater with respect to involvement of the repeater in the access procedure, which may reduce signaling overhead and/or improve resource usage efficiency when configuring involvement of the repeater in the access procedure.

For example, with regard to an initial access procedure, a repeater that uses an in-band control path (e.g., a control path in a same frequency band as a data path) would have previously detected a base station on the frequency band and acquired system information (SI) associated with the base station. Therefore, the repeater would have information indicating a location (e.g., in a time-domain) of SSBs transmitted by the base station (e.g., based on a bitmap received in system information block 1 (SIB1) and/or one or more radio resource control (RRC) messages that indicate the location of actually transmitted SSBs), a RMSI PDCCH configuration and resources associated with each SSB, a RACH message (e.g., MSG1) configuration and resources associated with each SSB, and a PDCCH configuration and resource for RACH responses. Such information can be leveraged to allow a number and/or size of control messages, associated with configuring involvement of the repeater in the initial access procedure, to be reduced, thereby reducing signaling overhead and/or improving resource usage efficiency associated with configuring the repeater.

In some aspects, the improved configuration of the repeater may utilize configuration information associated with configuring involvement of the repeater in an access procedure (herein referred to as an access procedure configuration). In some aspects, the access procedure configuration may require a comparatively smaller amount of information than a configuration provided via a typical common-purpose control message. In some aspects, as described in further detail below, a base station may determine the access procedure configuration and may transmit the access procedure configuration to the repeater. The repeater may receive the access procedure configuration, receive a signal associated with the access procedure from a first wireless communication device (e.g., the base station, a UE, or the like), and forward the signal associated with the access procedure to a second wireless communication device (e.g., the UE, the base station, or the like) based at least in part on the access procedure configuration.

FIG. 6 is a diagram illustrating an example 600 associated with access procedure configuration of a repeater (e.g., a mmW repeater 140), in accordance with the present disclosure. In example 600, the repeater is to act as a relay between a base station (e.g., a base station 110) and a UE (e.g., UE 120).

As shown in FIG. 6 by reference 602, the base station may determine configuration information associated with configuring involvement of the repeater in an access procedure when forwarding a signal (e.g., to/from the UE). Such configuration information is herein referred to an access procedure configuration. The base station may determine the configuration information using, for example, transmit processor 220, receive processor 238, controller/processor 240, memory 242, determination component 1106, or the like.

In some aspects, the access procedure configuration may include an indication of whether the repeater is to forward signals in resources associated with a set of SSBs, PDCCHs associated with scheduling RMSI associated with the set of SSBs, RACH messages carried in RACH occasions associated with the set of SSBs, PDCCHs associated with scheduling RACH responses, and/or the like.

In some aspects, the indication can be carried in a single bit. For example, a single bit may be used to indicate whether the repeater is to forward signals (e.g., uplink signals and downlink signals) on resources associated with the set of SSBs, PDCCHs associated with scheduling RMSI associated with the set of SSBs, RACH messages carried in RACH occasions associated with the set of SSBs, and PDCCHs associated with scheduling responses to the RACH messages. Here, a first value (e.g., 1) of the single bit may be used to indicate that the repeater is to forward signals in resources associated with each of the above described types of access procedure communications, while a second value (e.g., 0) of the single bit may be used to indicate that the repeater is not to forward signals in the resources associated with any of these types of access procedure communications.

Alternatively, in some aspects, the indication may be carried in a bitmap. For example, a bitmap may be used to indicate whether the repeater is to forward signals on resources associated with the set of SSBs, PDCCHs associated with scheduling RMSI associated with the set of SSBs, RACH messages carried in RACH occasions associated with the set of SSBs, and/or PDCCHs associated with scheduling responses to the RACH messages. Here, a first value (e.g., 1) in a first bit of the bitmap may be used to indicate that the repeater is to forward signals in resources associated with a first type of access procedure communication (e.g., the set of SSBs), while a second value (e.g., 0) in the first bit may be used to indicate that the repeater is not to forward signals in resources associated with the first type of access procedure communication. Similarly, the first value in a second bit in the bitmap may be used to indicate that the repeater is to forward signals in resources associated with a second type of access procedure communication (e.g., PDCCHs associated with scheduling RMSI), while the second value in the second bit may be used to indicate that the repeater is not to forward signals in resources associated with the second type of access procedure communication.

In some aspects, the access procedure configuration may include a bitmap comprising a set of bits, where a given bit of the set of bits indicates whether to forward signals in resources associated with a particular SSB and, optionally, one or more other types of access procedure communications associated with the particular SSB (e.g., PDCCHs associated with scheduling RMSI associated with the particular SSB, RACH messages associated with the particular SSB, PDCCHs associated with scheduling RACH responses for the RACH messages associated with the SSB, or the like). For example, a first value (e.g., 1) in a first bit of the bitmap may be used to indicate that the repeater is to forward signals in resources associated with a first SSB and in resources associated with other types of access procedure communications associated with the first SSB, while a second value (e.g., 0) in the first bit of the bitmap may be used to indicate that the repeater is not to forward signals in resources associated with the first SSB or in resources associated with other types of access procedure communications associated with the first SSB. Similarly, the first value in a second bit of the bitmap may be used to indicate that the repeater is to forward signals in resources associated with a second SSB and in resources associated with other types of access procedure communications associated with the second SSB, while the second value in the second bit of the bitmap may be used to indicate that the repeater is not to forward signals in resources associated with the second SSB or in resources associated with other types of access procedure communications associated with the second SSB. In some aspects, a number of bits in the bitmap may match a maximum number of SSBs for a frequency range in which the repeater is operating (e.g., the bitmap may have a size of 64 bits for FR2). Alternatively, in some aspects, a number of bits in the bitmap may match a number of SSBs actually transmitted by the base station (which may be previously indicated to the repeater by the base station via, for example, an RRC message). Alternatively, in some aspects, the bitmap may be a compressed bitmap (e.g., such that a number of bits in the bitmap is less than a number of SSBs actually transmitted by the base station). In such a case, a first bit of the bitmap may correspond to a first subset of the SSBs, a second bit of the bitmap may correspond to a second subset of the SSBs, and so on (e.g., such that the access procedure configuration is the same for each subset of SSBs).

In some aspects, the access procedure configuration may include a beamforming configuration. That is, in some aspects, the access procedure configuration may include beamforming configuration information that indicates beam directions to be used (e.g., on the service-side) for forwarding signals in resources associated with the access procedure.

As shown by reference 604, the base station may transmit, and the repeater may receive, the access procedure configuration. In some aspects, the base station has a control interface to the repeater, and the base station may transmit the access procedure configuration via the control interface. In some aspects, the base station may transmit, and the repeater may receive, the access procedure configuration via, for example, DCI, a medium access control control element (MAC-CE), RRC signaling, and/or the like. The base station may transmit the access procedure configuration using, for example, transmit processor 220, antenna 234, controller/processor 240, memory 242, transmission component 1108, or the like. The repeater may receive the access procedure configuration using, for example, antenna 510, controller 530, communication component 540, reception component 904, or the like.

In some aspects, the base station may transmit, and the repeater may receive, the access procedure configuration in a special-purpose control signal associated with configuring involvement of repeaters in access procedures. The special-purpose control signal may be a signal that uses, for example, a DCI format that is configured differently from a common-purpose control signal (e.g. a different radio network temporary identifier (RNTI), different resources, or the like). In other words, in some aspects, the access procedure configuration may be conveyed in a control signal defined for conveying access procedure configurations.

Alternatively, in some aspects, the base station may transmit, and the repeater may receive, the access procedure configuration in a common-purpose control signal that includes an indication that the common-purpose control signal is associated with configuring involvement of the repeater in the access procedure. For example, the access procedure configuration may be provided in a common-purpose control signal (e.g., DCI) that includes a header indicating that the purpose of the common-purpose control signal is associated with configuring involvement of the repeater in the access procedure.

In some aspects, the repeater receives a signal associated with the access procedure from a first wireless communication device and forwards the signal to a second wireless communication device. In some aspects, the repeater receives and/or forwards the signal based at least in part on the access procedure configuration and other information associated with the access procedure (e.g., information previously received by the repeater). The other information may include, for example, information indicating a location (e.g., in a time-domain) of a set of SSBs, RMSI PDCCH configuration and resources associated with each SSB of the set of SSBs, a RACH message configuration and resources associated with SSB of the set of SSBs, and/or a PDCCH configuration and resource for RACH responses associated with the RACH messages. In some aspects, such other information may be received from the base station via a SIB, an RRC message, or the like (e.g., when the repeater acquires SI associated with the base station, as described above). The repeater may receive the signal using, for example, antenna 510, controller 530, communication component 540, reception component 904, or the like. The repeater may forward the signal using, for example, antenna 510, controller 530, communication component 540, forwarding component 906, transmission component 908, or the like As an example, as shown by reference 606, the repeater may receive a first signal associated with the access procedure from the base station and, as shown by reference 608, may forward the first signal to the UE. The first signal may include, for example, a first SSB transmitted by the base station. Here, the access procedure configuration may indicate (e.g., via a one bit indication, via a bitmap, or the like), that the repeater is to forward the first SSB, and the other information may identify resources in which the base station is to transmit the first SSB. In this example, the repeater may, based at least in part on the access procedure configuration and the other information, receive the signal in the resources associated with the first SSB and may forward the signal to the UE.

As another example, as shown by reference 610, the repeater may receive a second signal associated with the access procedure from the UE and, as shown by reference 612, may forward the second signal to the base station. The second signal may include, for example, a RACH message associated with the first SSB. Here, the access procedure configuration may indicate (e.g., via a one bit indication, via a bitmap, or the like), that the repeater is to forward RACH messages associated with the first SSB, and the other information may identify resources in which RACH messages associated with the first SSB are to be transmitted by UEs. In this example, the repeater may, based at least in part on the access procedure configuration and the other information, receive the signal in the resources associated with RACH messages associated with the first SSB and may forward the signal to the base station.

In some aspects, the repeater may forward the signal further based at least in part on a beamforming configuration received by the repeater (e.g., a beamforming configuration included in the access procedure configuration, a beamforming configuration received by the repeater at an earlier time, or the like).

As indicated above, FIG. 6 is provided as an example. Other examples may differ from what is described with respect to FIG. 6.

Figure 7:
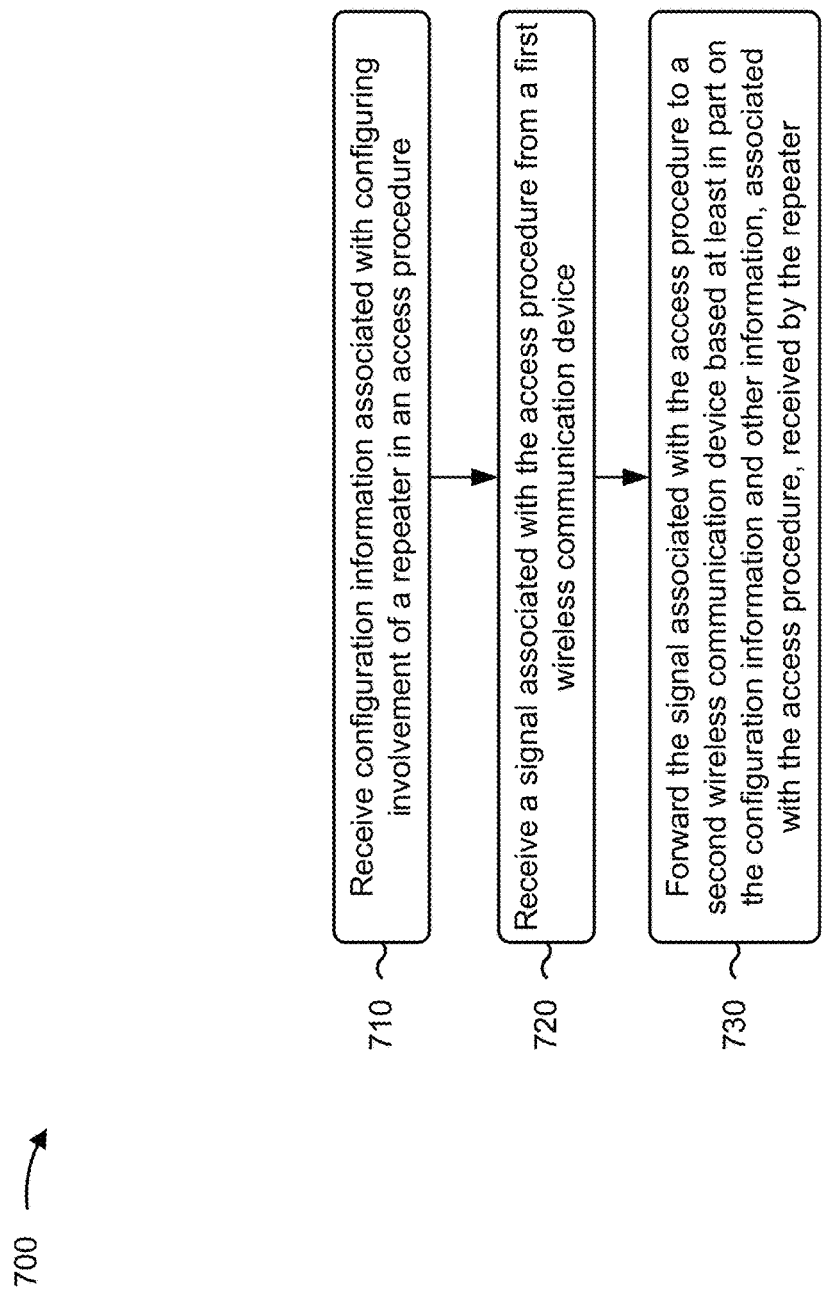
FIG. 7 is a diagram illustrating an example process performed, for example, by a repeater, in accordance with the present disclosure.

FIG. 7 is a diagram illustrating an example process 700 performed, for example, by a repeater, in accordance with the present disclosure. Example process 700 is an example where the repeater (e.g., mmW repeater 140, mmW repeater 500, and/or the like) performs operations associated with access procedure configuration of a repeater.

As shown in FIG. 7, in some aspects, process 700 may include receiving configuration information associated with configuring involvement of the repeater in an access procedure (block 710). For example, the repeater (e.g., using antenna 510, controller 530, communication component 540, and/or the like) may receive configuration information associated with configuring involvement of the repeater in an access procedure, as described above in association with, for example, reference 604 of FIG. 6.

As further shown in FIG. 7, in some aspects, process 700 may include receiving a signal associated with the access procedure from a first wireless communication device (block 720). For example, the repeater (e.g., using antenna 510, controller 530, communication component 540, MUX/DE-MULTIPLEXER 550, and/or the like) may receive a signal associated with the access procedure from a first wireless communication device, as described above in association with, for example, references 606 and 610 of FIG. 6.

As further shown in FIG. 7, in some aspects, process 700 may include forwarding the signal associated with the access procedure to a second wireless communication device based at least in part on the configuration information and other information, associated with the access procedure received by the repeater (block 730). For example, the repeater (e.g., using antenna 510, gain component 520, controller 530, communication component 540, MUX/DEMULTIPLEXER 550, and/or the like) may forward the signal associated with the access procedure to a second wireless communication device based at least in part on the configuration information and other information, associated with the access procedure, received by the repeater, as described above in association with, for example, references 608 and 612 of FIG. 6.

Process 700 may include additional aspects, such as any single aspect or any combination of aspects described below and/or in connection with one or more other processes described elsewhere herein.

In a first aspect, the signal is forwarded further based at least in part on other information, associated with the access procedure, received by the repeater. In a second aspect, alone or in combination with the first aspect, the other information associated with the access procedure is received via at least one of: a system information block, or a radio resource control message.

In a third aspect, alone or in combination with one or more of the first and second aspects, the configuration information includes an indication of whether to forward signals in resources associated with at least one of: a set of SSBs, PDCCHs associated with scheduling remaining minimum system information associated with the set of SSBs, RACH messages associated with the set of SSBs, or PDCCHs associated with scheduling RACH responses for the RACH messages associated with the set of SSBs. In a fourth aspect, alone or in combination with one or more of the first through third aspects, the indication is carried in a single bit. In a fifth aspect, alone or in combination with one or more of the first through fourth aspects, the indication is carried in a bitmap.

In a sixth aspect, alone or in combination with one or more of the first through fifth aspects, the configuration information includes a bitmap comprising a set of bits, and a bit of the set of bits indicates whether to forward signals in resources associated with an SSB of a set of SSBs and at least one of: PDCCHs associated with scheduling remaining minimum system information associated with the SSB, RACH messages associated with the SSB, or PDCCHs associated with scheduling RACH responses for the RACH messages associated with the SSB. In a seventh aspect, alone or in combination with one or more of the first through sixth aspects, a number of bits in the bitmap matches a maximum number of SSBs for a frequency range in which the repeater is operating. In an eighth aspect, alone or in combination with one or more of the first through seventh aspects, a number of bits in the bitmap matches a number of SSBs actually transmitted by a base station. In a ninth aspect, alone or in combination with one or more of the first through eighth aspects, the bitmap is a compressed bitmap such that a number of bits in the bitmap is less than a number of SSBs actually transmitted by a base station.

In a tenth aspect, alone or in combination with one or more of the first through ninth aspects, the configuration information includes a beamforming configuration.

In an eleventh aspect, alone or in combination with one or more of the first through tenth aspects, the configuration information is received via at least one of: downlink control information, a medium access control control element, or radio resource control signaling.

In a twelfth aspect, alone or in combination with one or more of the first through eleventh aspects, the configuration information is received in a special-purpose control signal associated with configuring involvement of repeaters in access procedures. In a thirteenth aspect, alone or in combination with one or more of the first through twelfth aspects, the configuration information is received in a common-purpose control signal that includes an indication that the common-purpose control signal is associated with configuring involvement of the repeater in the access procedure.

In a fourteenth aspect, alone or in combination with one or more of the first through thirteenth aspects, the repeater operates in a millimeter wave frequency range. In a fifteenth aspect, alone or in combination with one or more of the first through fourteenth aspects, the repeater has a control interface to a base station associated with configuring operation of the repeater. In a sixteenth aspect, alone or in combination with one or more of the first through fifteenth aspects, the signal is forwarded based at least in part on a beamforming configuration received by the repeater.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
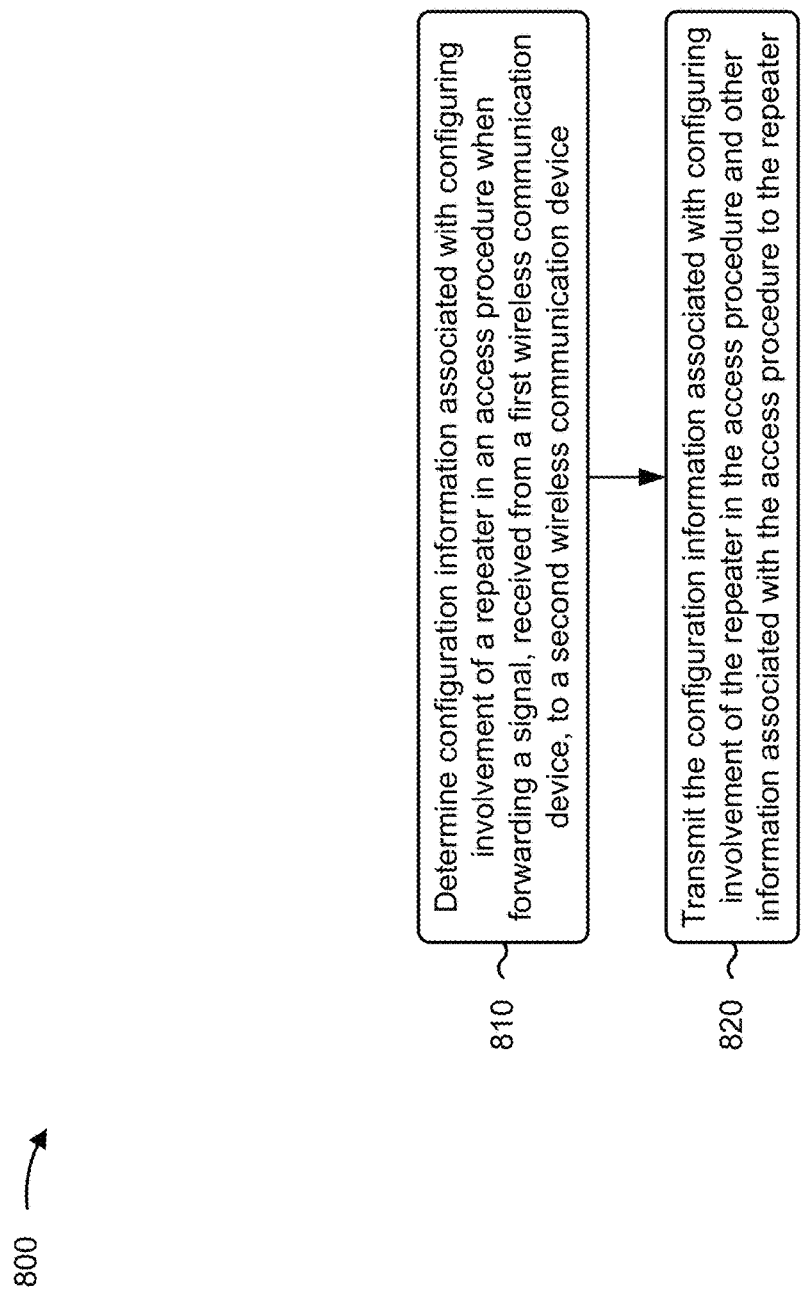
FIG. 8 is a diagram illustrating an example process performed, for example, by a base station, in accordance with the present disclosure.

FIG. 8 is a diagram illustrating an example process 800 performed, for example, by a base station, in accordance with the present disclosure. Example process 800 is an example where the base station (e.g., base station 110 and/or the like) performs operations associated with access procedure configuration of a repeater.

As shown in FIG. 8, in some aspects, process 800 may include determining configuration information associated with configuring involvement of a repeater in an access procedure when forwarding a signal, received from a first wireless communication device, to a second wireless communication device (block 810). For example, the base station (e.g., using transmit processor 220, receive processor 238, controller/processor 240, memory 242, and/or the like) may determine configuration information associated with configuring involvement of a repeater (e.g., mmW repeater 140) in an access procedure when forwarding a signal, received from a first wireless communication device, to a second wireless communication device, as described above in association with, for example, reference 602 of FIG. 6.

As further shown in FIG. 8, in some aspects, process 800 may include transmitting the configuration information associated with configuring involvement of the repeater in the access procedure and other information associated with the access procedure to the repeater (block 820). For example, the base station (e.g., using transmit processor 220, controller/processor 240, memory 242, and/or the like) may transmit the configuration information associated with configuring involvement of the repeater in the access procedure and other information associated with the access procedure to the repeater, as described above in association with, for example, reference 604 of FIG. 6.

Process 800 may include additional aspects, such as any single aspect or any combination of aspects described below and/or in connection with one or more other processes described elsewhere herein.

In a first aspect, other information associated with the access procedure is transmitted to the repeater. In a second aspect, alone or in combination with the first aspect, the other information associated with the access procedure is transmitted via at least one of: a system information block, or a radio resource control message.

In a third aspect, alone or in combination with one or more of the first and second aspects, the configuration information includes an indication of whether the repeater is to forward signals in resources associated with at least one of: a set of SSBs, PDCCHs associated with scheduling remaining minimum system information associated with the set of SSBs, RACH messages associated with the set of SSBs, or PDCCHs associated with scheduling RACH responses for the RACH messages associated with the set of SSBs. In a fourth aspect, alone or in combination with one or more of the first through third aspects, the indication is carried in a single bit. In a fifth aspect, alone or in combination with one or more of the first through fourth aspects, the indication is carried in a bitmap.

In a sixth aspect, alone or in combination with one or more of the first through fifth aspects, the configuration information includes a bitmap comprising a set of bits, and a bit of the set of bits indicates whether the repeater is to forward signals in resources associated with an SSB of a set of SSBs and at least one of: PDCCHs associated with scheduling remaining minimum system information associated with the SSB, RACH messages associated with the SSB, or PDCCHs associated with scheduling RACH responses for the RACH messages associated with the SSB. In a seventh aspect, alone or in combination with one or more of the first through sixth aspects, a number of bits in the bitmap matches a maximum number of SSBs for a frequency range in which the repeater is operating. In an eighth aspect, alone or in combination with one or more of the first through seventh aspects, a number of bits in the bitmap matches a number of SSBs actually transmitted by the base station. In a ninth aspect, alone or in combination with one or more of the first through eighth aspects, the bitmap is a compressed bitmap such that a number of bits in the bitmap is less than a number of SSBs actually transmitted by the base station.

In a tenth aspect, alone or in combination with one or more of the first through ninth aspects, the configuration information includes a beamforming configuration.

In an eleventh aspect, alone or in combination with one or more of the first through tenth aspects, the configuration information is transmitted via at least one of: downlink control information, a medium access control control element, or radio resource control signaling.

In a twelfth aspect, alone or in combination with one or more of the first through eleventh aspects, the configuration information is transmitted in a special-purpose control signal associated with configuring involvement of repeaters in access procedures. In a thirteenth aspect, alone or in combination with one or more of the first through twelfth aspects, the configuration information is transmitted in a common-purpose control signal that includes an indication that the common-purpose control signal is associated with configuring involvement of the repeater in the access procedure.

In a fourteenth aspect, alone or in combination with one or more of the first through thirteenth aspects, the repeater operates in a millimeter wave frequency range. In a fifteenth aspect, alone or in combination with one or more of the first through fourteenth aspects, the base station has a control interface to the repeater.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
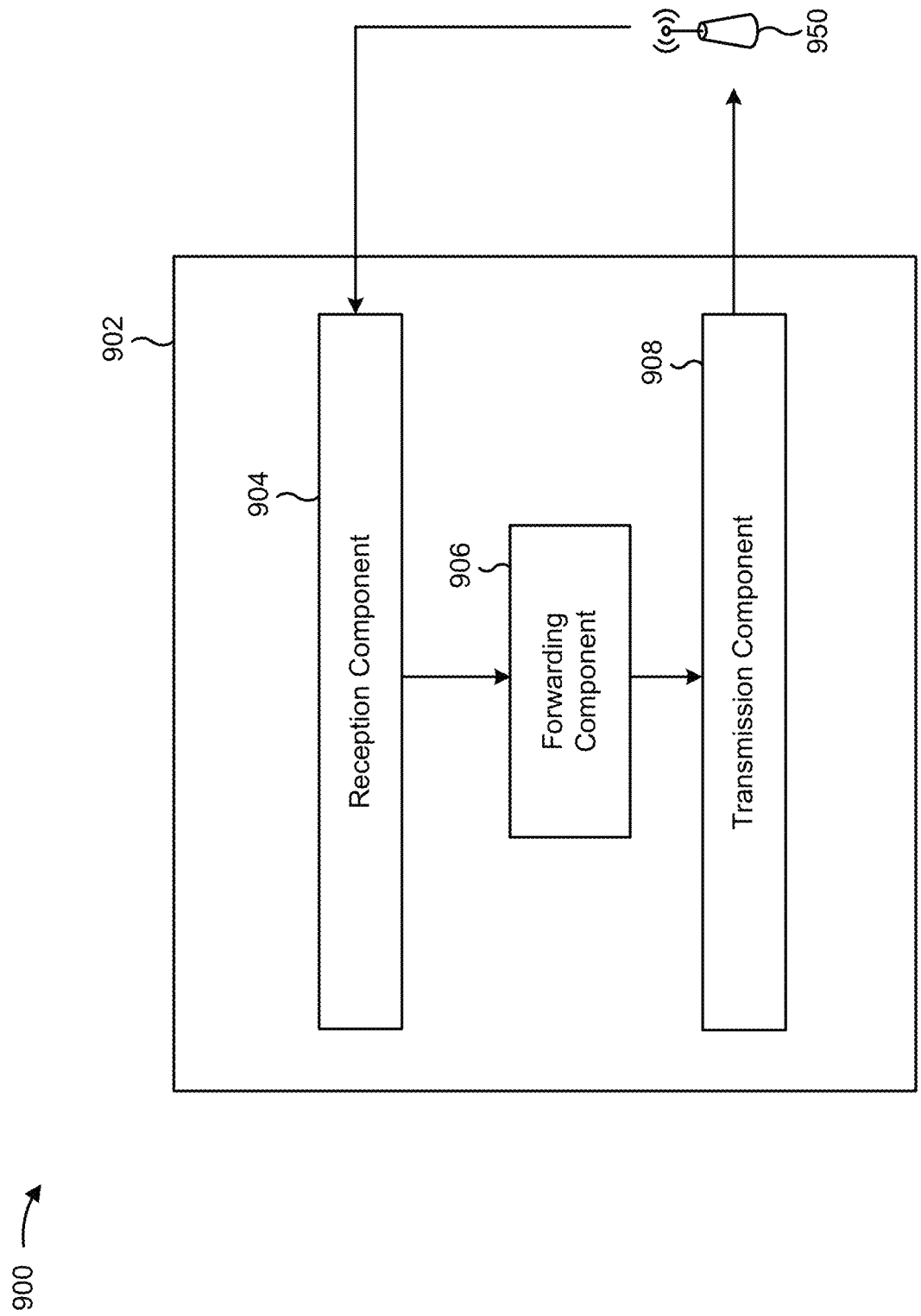
FIG. 9 is a data flow diagram illustrating an example of a data flow between different components in an example apparatus, in accordance with the present disclosure.

FIG. 9 is a conceptual data flow diagram 900 illustrating a data flow between different components in an example apparatus 902. The apparatus 902 may be a repeater (e.g., mmW repeater 140). In some aspects, the apparatus 902 includes a reception component 904, a forwarding component 906, and/or a transmission component 908.

In some aspects, reception component 904 may receive configuration information associated with configuring involvement of the repeater in an access procedure, and may receive a signal associated with the access procedure from a first wireless communication device. In some aspects, the forwarding component 906 and/or the transmission component 908 may forward the signal associated with the access procedure to a second wireless communication device based at least in part on the configuration information and other information, associated with the access procedure, received by the repeater.

The apparatus may include additional components that perform each of the blocks of the algorithm in the aforementioned process 700 of FIG. 7 and/or the like. Each block in the aforementioned process 700 of FIG. 7 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of components (e.g., one or more components) shown in FIG. 9 may perform one or more functions described as being performed by another set of components shown in FIG. 9.

Figure 10:
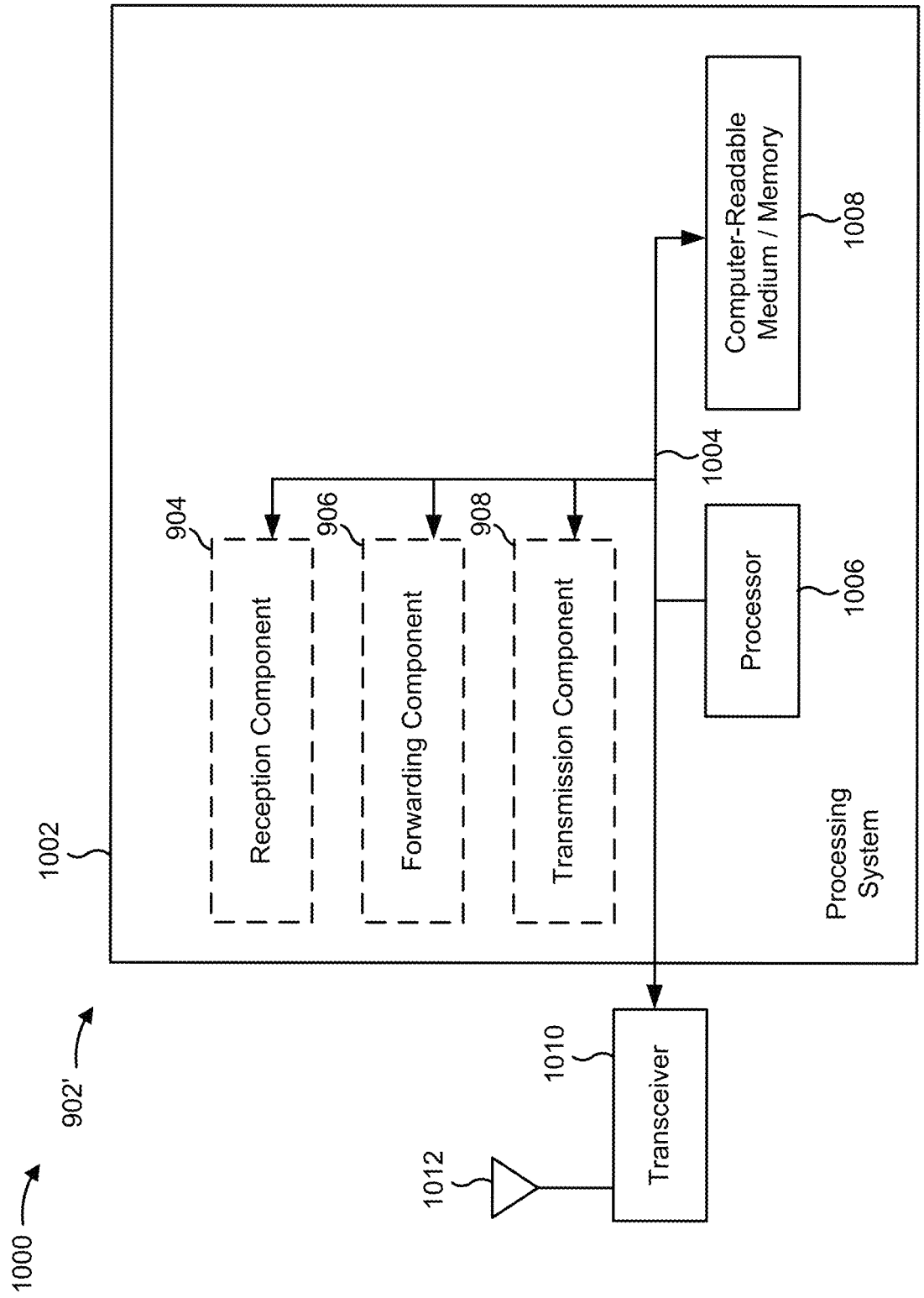
FIG. 10 is a diagram illustrating an example of a hardware implementation for an apparatus employing a processing system, in accordance with the present disclosure.

FIG. 10 is a diagram 1000 illustrating an example of a hardware implementation for an apparatus 902' employing a processing system 1002. The apparatus 902' may be a repeater (e.g., mmW repeater 140).

The processing system 1002 may be implemented with a bus architecture, represented generally by the bus 1004. The bus 1004 may include any number of interconnecting buses and bridges depending on the specific application of the processing system 1002 and the overall design constraints. The bus 1004 links together various circuits including one or more processors and/or hardware components, represented by the processor 1006, the components 904, 906, and/or 908, and the computer-readable medium/memory 1008. The bus 1004 may also link various other circuits such as timing sources, peripherals, voltage regulators, and power management circuits, which are well known in the art, and therefore will not be described any further.

The processing system 1002 may be coupled to a transceiver 1010. The transceiver 1010 is coupled to one or more antennas 1012. The transceiver 1010 provides a means for communicating with various other apparatuses over a transmission medium. The transceiver 1010 receives a signal from the one or more antennas 1012, extracts information from the received signal, and provides the extracted information to the processing system 1002, specifically the reception component 904. In addition, the transceiver 1010 receives information from the processing system 1002, specifically the transmission component 908, and based at least in part on the received information, generates a signal to be applied to the one or more antennas 1012. The processing system 1002 includes a processor 1006 coupled to a computer-readable medium/memory 1008. The processor 1006 is responsible for general processing, including the execution of software stored on the computer-readable medium/memory 1008. The software, when executed by the processor 1006, causes the processing system 1002 to perform the various functions described herein for any particular apparatus. The computer-readable medium/memory 1008 may also be used for storing data that is manipulated by the processor 1006 when executing software. The processing system further includes at least one of the components 904, 906, and/or 908. The components may be software modules running in the processor 1006, resident/stored in the computer-readable medium/memory 1008, one or more hardware modules coupled to the processor 1006, or some combination thereof. The processing system 1002 may be a component of the UE 120 and may include the memory 282 and/or at least one of the TX MIMO processor 266, the RX processor 258, and/or the controller/processor 280.

In some aspects, the apparatus 902/902' for wireless communication includes means for receiving configuration information associated with configuring involvement of the apparatus 902/902' in an access procedure; means for receiving a signal associated with the access procedure from a first wireless communication device; means for forwarding the signal associated with the access procedure to a second wireless communication device based at least in part on the configuration information and other information, associated with the access procedure, received by the repeater; and/or the like. The aforementioned means may be one or more of the aforementioned components of the apparatus 902 and/or the processing system 1002 of the apparatus 902' configured to perform the functions recited by the aforementioned means. As described elsewhere herein, the processing system 1002 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 10 is provided as an example. Other examples may differ from what is described in connection with FIG. 10.

Figure 11:
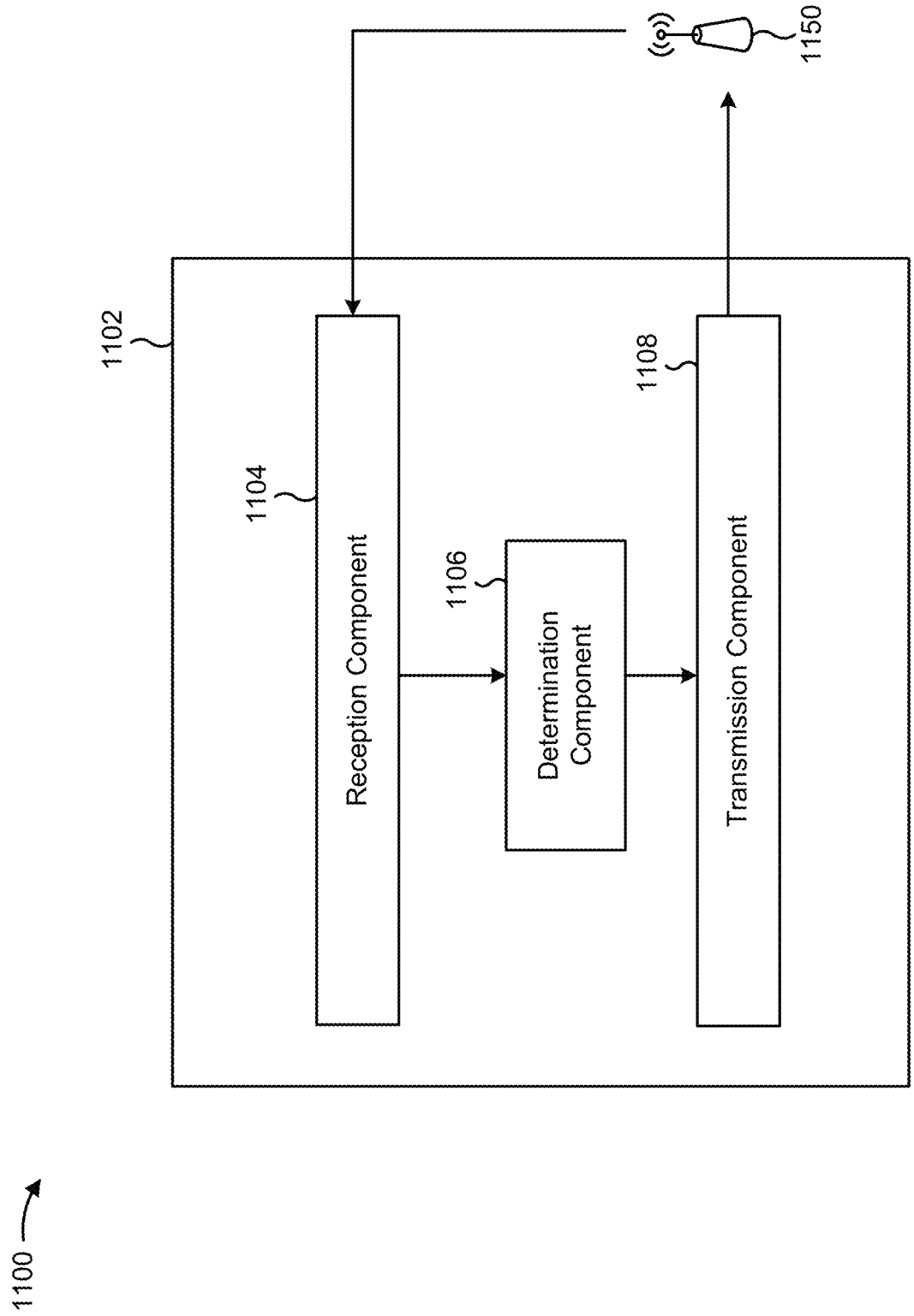
FIG. 11 is a data flow diagram illustrating an example of a data flow between different components in an example apparatus, in accordance with the present disclosure.

FIG. 11 is a conceptual data flow diagram 1100 illustrating a data flow between different components in an example apparatus 1102. The apparatus 1102 may be a base station (e.g., base station 110). In some aspects, the apparatus 1102 includes a reception component 1104, a determination component 1106, and/or a transmission component 1108.

In some aspects, determination component 1106 may determine configuration information associated with configuring involvement of a repeater in an access procedure when forwarding a signal, received from a first wireless communication device, to a second wireless communication device. In some aspects, transmission component 908 may transmit the configuration information associated with configuring involvement of the repeater in the access procedure and other information associated with the access procedure to the repeater.

The apparatus may include additional components that perform each of the blocks of the algorithm in the aforementioned process 800 of FIG. 8 and/or the like. Each block in the aforementioned process 800 of FIG. 8 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of components (e.g., one or more components) shown in FIG. 11 may perform one or more functions described as being performed by another set of components shown in FIG. 11.

Figure 12:
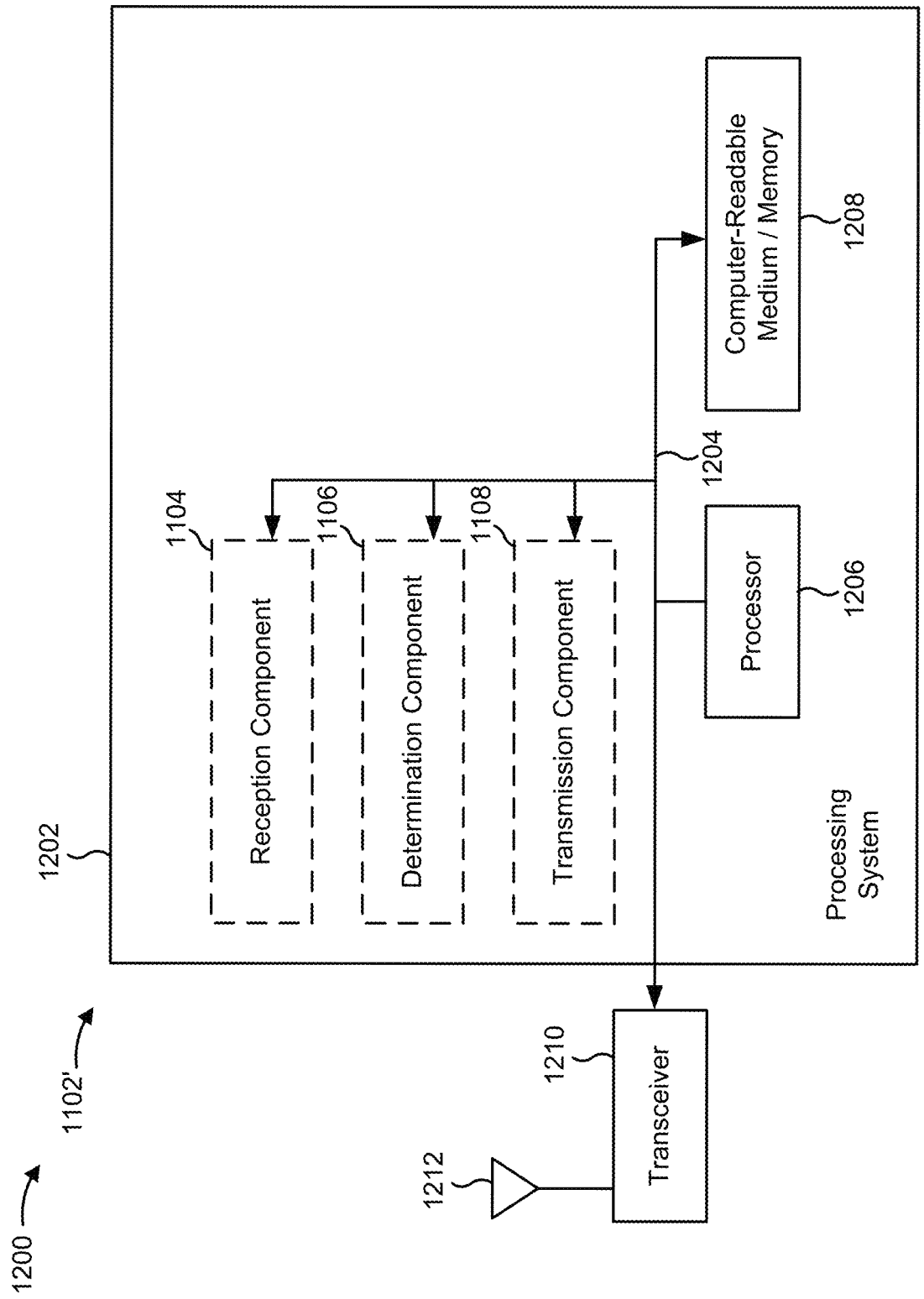
FIG. 12 is a diagram illustrating an example of a hardware implementation for an apparatus employing a processing system, in accordance with the present disclosure.

FIG. 12 is a diagram 1200 illustrating an example of a hardware implementation for an apparatus 1102' employing a processing system 1202. The apparatus 1102' may be a base station (e.g., base station 110).

The processing system 1202 may be implemented with a bus architecture, represented generally by the bus 1204. The bus 1204 may include any number of interconnecting buses and bridges depending on the specific application of the processing system 1202 and the overall design constraints. The bus 1204 links together various circuits including one or more processors and/or hardware components, represented by the processor 1206, the components 1104, 1106, and/or 1108, and the computer-readable medium/memory 1208. The bus 1204 may also link various other circuits such as timing sources, peripherals, voltage regulators, and power management circuits, which are well known in the art, and therefore will not be described any further.

The processing system 1202 may be coupled to a transceiver 1210. The transceiver 1210 is coupled to one or more antennas 1212. The transceiver 1210 provides a means for communicating with various other apparatuses over a transmission medium. The transceiver 1210 receives a signal from the one or more antennas 1212, extracts information from the received signal, and provides the extracted information to the processing system 1202, specifically the reception component 1104. In addition, the transceiver 1210 receives information from the processing system 1202, specifically the transmission component 1108, and based at least in part on the received information, generates a signal to be applied to the one or more antennas 1212. The processing system 1202 includes a processor 1206 coupled to a computer-readable medium/memory 1208. The processor 1206 is responsible for general processing, including the execution of software stored on the computer-readable medium/memory 1208. The software, when executed by the processor 1206, causes the processing system 1202 to perform the various functions described herein for any particular apparatus. The computer-readable medium/memory 1208 may also be used for storing data that is manipulated by the processor 1206 when executing software. The processing system further includes at least one of the components 1104, 1106, and/or 1108. The components may be software modules running in the processor 1206, resident/stored in the computer-readable medium/memory 1208, one or more hardware modules coupled to the processor 1206, or some combination thereof. The processing system 1202 may be a component of the base station 110 and may include the memory 242 and/or at least one of the TX MIMO processor 230, the RX processor 238, and/or the controller/processor 240.

In some aspects, the apparatus 1102/1102' for wireless communication includes means for determining configuration information associated with configuring involvement of a repeater in an access procedure when forwarding a signal, received from a first wireless communication device, to a second wireless communication device; means for transmitting the configuration information associated with configuring involvement of the repeater in the access procedure and other information associated with the access procedure to the repeater; and/or the like. The aforementioned means may be one or more of the aforementioned components of the apparatus 1102 and/or the processing system 1202 of the apparatus 1102' configured to perform the functions recited by the aforementioned means. As described elsewhere herein, the processing system 1202 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 12 is provided as an example. Other examples may differ from what is described in connection with FIG. 12.

The following provides an overview of some Aspects of the present disclosure:

Aspect 1: A method of wireless communication performed by a repeater, comprising: receiving configuration information associated with configuring involvement of the repeater in an access procedure; receiving a signal associated with the access procedure from a first wireless communication device; and forwarding the signal associated with the access procedure to a second wireless communication device based at least in part on the configuration information.

Aspect 2: The method of Aspect 1, wherein the signal is forwarded further based at least in part on other information, associated with the access procedure, received by the repeater.

Aspect 3: The method of Aspect 2, wherein the other information associated with the access procedure is received via at least one of: a system information block, or a radio resource control message.

Aspect 4: The method of any of Aspects 1-3, wherein the configuration information includes an indication of whether to forward signals in resources associated with at least one of: a set of synchronization signal blocks (SSBs), physical downlink control channels (PDCCHs) associated with scheduling remaining minimum system information associated with the set of SSBs, random access channel (RACH) messages associated with the set of SSBs, or PDCCHs associated with scheduling RACH responses for the RACH messages associated with the set of SSBs.

Aspect 5: The method of Aspect 4, wherein the indication is carried in a single bit.

Aspect 6: The method of any of Aspects 4-5, wherein the indication is carried in a bitmap.

Aspect 7: The method of any of Aspects 1-6, wherein the configuration information includes a bitmap comprising a set of bits, wherein a bit of the set of bits indicates whether to forward signals in resources associated with a synchronization signal block (SSB) of a set of SSBs and at least one of: physical downlink control channel (PDCCHs) associated with scheduling remaining minimum system information associated with the SSB, random access channel (RACH) messages associated with the SSB, or PDCCHs associated with scheduling RACH responses for the RACH messages associated with the SSB.

Aspect 8: The method of Aspect 7, wherein a number of bits in the bitmap matches a maximum number of SSBs for a frequency range in which the repeater is operating.

Aspect 9: The method of Aspect 7, wherein a number of bits in the bitmap matches a number of SSBs actually transmitted by a base station.

Aspect 10: The method of Aspect 7, wherein the bitmap is a compressed bitmap such that a number of bits in the bitmap is less than a number of SSBs actually transmitted by a base station.

Aspect 11: The method of any of Aspects 1-10, wherein the configuration information includes a beamforming configuration.

Aspect 12: The method of any of Aspects 1-11, wherein the configuration information is received via at least one of: downlink control information, a medium access control control element, or radio resource control signaling.

Aspect 13: The method of any of Aspects 1-12, wherein the configuration information is received in a special-purpose control signal associated with configuring involvement of repeaters in access procedures.

Aspect 14: The method of any of Aspects 1-12, wherein the configuration information is received in a common-purpose control signal that includes an indication that the common-purpose control signal is associated with configuring involvement of the repeater in the access procedure.

Aspect 15: The method of any of Aspects 1-14, wherein the repeater operates in a millimeter wave frequency range.

Aspect 16: The method of any of Aspects 1-15, wherein the repeater has a control interface to a base station associated with configuring operation of the repeater.

Aspect 17: The method of any of Aspects 1-16, wherein the signal is forwarded based at least in part on a beamforming configuration received by the repeater.

Aspect 18: A method of wireless communication performed by a base station, comprising: determining configuration information associated with configuring involvement of a repeater in an access procedure when forwarding a signal, received from a first wireless communication device, to a second wireless communication device; and transmitting the configuration information associated with configuring involvement of the repeater in the access procedure.

Aspect 19: The method of Aspect 18, wherein other information associated with the access procedure is transmitted to the repeater.

Aspect 20: The method of Aspect 19, wherein the other information associated with the access procedure is transmitted via at least one of: a system information block, or a radio resource control message.

Aspect 21: The method of any of Aspects 18-20, wherein the configuration information includes an indication of whether the repeater is to forward signals in resources associated with at least one of: a set of synchronization signal blocks (SSBs), physical downlink control channel (PDCCHs) associated with scheduling remaining minimum system information associated with the set of SSBs, random access channel (RACH) messages associated with the set of SSBs, or PDCCHs associated with scheduling RACH responses for the RACH messages associated with the set of SSBs.

Aspect 22: The method of Aspect 21, wherein the indication is carried in a single bit.

Aspect 23: The method of Aspect 21, wherein the indication is carried in a bitmap.

Aspect 24: The method of any of Aspects 18-23, wherein the configuration information includes a bitmap comprising a set of bits, wherein a bit of the set of bits indicates whether the repeater is to forward signals in resources associated with a synchronization signal block (SSB) of a set of SSBs and at least one of: physical downlink control channel (PDCCHs) associated with scheduling remaining minimum system information associated with the SSB, random access channel (RACH) messages associated with the SSB, or PDCCHs associated with scheduling RACH responses for the RACH messages associated with the SSB.

Aspect 25: The method of Aspect 24, wherein a number of bits in the bitmap matches a maximum number of SSBs for a frequency range in which the repeater is operating.

Aspect 26: The method of Aspect 24, wherein a number of bits in the bitmap matches a number of SSBs actually transmitted by the base station.

Aspect 27: The method of Aspect 24, wherein the bitmap is a compressed bitmap such that a number of bits in the bitmap is less than a number of SSBs actually transmitted by the base station.

Aspect 28: The method of any of Aspects 18-27, wherein the configuration information includes a beamforming configuration.

Aspect 29: The method of any of Aspects 18-28, wherein the configuration information is transmitted via at least one of: downlink control information, a medium access control control element, or radio resource control signaling.

Aspect 30: The method of any of Aspects 18-29, wherein the configuration information is transmitted in a special-purpose control signal associated with configuring involvement of repeaters in access procedures.

Aspect 31: The method of any of Aspects 18-29, wherein the configuration information is transmitted in a common-purpose control signal that includes an indication that the common-purpose control signal is associated with configuring involvement of the repeater in the access procedure.

Aspect 32: The method of any of Aspects 18-31, wherein the repeater operates in a millimeter wave frequency range.

Aspect 33: The method of any of Aspects 18-32, wherein the base station has a control interface to the repeater.

Aspect 34: An apparatus for wireless communication at a device, comprising a processor; memory coupled with the processor; and instructions stored in the memory and executable by the processor to cause the apparatus to perform the method of one or more Aspects of Aspects 1-17.

Aspect 35: A device for wireless communication, comprising a memory and one or more processors coupled to the memory, the memory and the one or more processors configured to perform the method of one or more Aspects of Aspects 1-17.

Aspect 36: An apparatus for wireless communication, comprising at least one means for performing the method of one or more Aspects of Aspects 1-17.

Aspect 37: A non-transitory computer-readable medium storing code for wireless communication, the code comprising instructions executable by a processor to perform the method of one or more Aspects of Aspects 1-17.

Aspect 38: A non-transitory computer-readable medium storing a set of instructions for wireless communication, the set of instructions comprising one or more instructions that, when executed by one or more processors of a device, cause the device to perform the method of one or more Aspects of Aspects 1-17.

Aspect 39: An apparatus for wireless communication at a device, comprising a processor; memory coupled with the processor; and instructions stored in the memory and executable by the processor to cause the apparatus to perform the method of one or more Aspects of Aspects 18-33.

Aspect 40: A device for wireless communication, comprising a memory and one or more processors coupled to the memory, the memory and the one or more processors configured to perform the method of one or more Aspects of Aspects 18-33.

Aspect 41: An apparatus for wireless communication, comprising at least one means for performing the method of one or more Aspects of Aspects 18-33.

Aspect 42: A non-transitory computer-readable medium storing code for wireless communication, the code comprising instructions executable by a processor to perform the method of one or more Aspects of Aspects 18-33.

Aspect 43: A non-transitory computer-readable medium storing a set of instructions for wireless communication, the set of instructions comprising one or more instructions that, when executed by one or more processors of a device, cause the device to perform the method of one or more Aspects of Aspects 18-33.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a repeater, comprising:
   receiving configuration information associated with configuring involvement of the repeater in an access procedure;
   receiving a signal associated with the access procedure from a first wireless communication device; and
   forwarding the signal associated with the access procedure to a second wireless communication device based at least in part on the configuration information and other information, associated with the access procedure, received by the repeater,
   wherein the configuration information includes a bitmap comprising a set of bits,
      wherein a bit of the set of bits indicates whether to forward signals in resources associated with a synchronization signal block (SSB) of a set of SSBs and at least one of:
         physical downlink control channel (PDCCHs) associated with scheduling remaining minimum system information associated with the SSB,
         random access channel (RACH) messages associated with the SSB, or
         PDCCHs associated with scheduling RACH responses for the RACH messages associated with the SSB.

2. The method of claim 1, wherein the other information associated with the access procedure is received via at least one of:
   a system information block, or
   a radio resource control message.

3. The method of claim 1, wherein the configuration information includes an indication of whether to forward signals in resources associated with at least one of:
   the set of SSBs,
   PDCCHs associated with scheduling remaining minimum system information associated with the set of SSBs,
   RACH messages associated with the set of SSBs, or
   PDCCHs associated with scheduling RACH responses for the RACH messages associated with the set of SSBs.

4. The method of claim 1, wherein a number of bits in the bitmap matches a maximum number of SSBs for a frequency range in which the repeater is operating.

5. The method of claim 1, wherein a number of bits in the bitmap matches a number of SSBs actually transmitted by a base station.

6. The method of claim 1, wherein the bitmap is a compressed bitmap such that a number of bits in the bitmap is less than a number of SSBs actually transmitted by a base station.

7. The method of claim 1, wherein the configuration information includes a beamforming configuration.

8. The method of claim 1, wherein the configuration information is received via at least one of:
   downlink control information,
   a medium access control control element, or
   radio resource control signaling.

9. The method of claim 1, wherein the configuration information is received in a special-purpose control signal associated with configuring involvement of repeaters in access procedures.

10. The method of claim 1, wherein the configuration information is received in a common-purpose control signal that includes an indication that the common-purpose control signal is associated with configuring involvement of the repeater in the access procedure.

11. The method of claim 1, wherein the repeater operates in a millimeter wave frequency range.

12. The method of claim 1, wherein the repeater has a control interface to a base station associated with configuring operation of the repeater.

13. The method of claim 1, wherein the signal is forwarded based at least in part on a beamforming configuration received by the repeater.

14. A method of wireless communication performed by a base station, comprising:
   determining configuration information associated with configuring involvement of a repeater in an access procedure when forwarding a signal, received from a first wireless communication device, to a second wireless communication device; and
   transmitting the configuration information associated with configuring involvement of the repeater in the access procedure and other information associated with the access procedure to the repeater, wherein the configuration information includes a bitmap comprising a set of bits, wherein a bit of the set of bits indicates whether to forward signals in resources associated with a synchronization signal block (SSB) of a set of SSBs and at least one of:

physical downlink control channel (PDCCHs) associated with scheduling remaining minimum system information associated with the SSB, random access channel (RACH) messages associated with the SSB, or PDCCHs associated with scheduling RACH responses for the RACH messages associated with the SSB.

15. The method of claim 14, wherein the other information associated with the access procedure is transmitted via at least one of:

a system information block, or a radio resource control message.

16. The method of claim 14, wherein the configuration information includes an indication of whether the repeater is to forward signals in resources associated with at least one of:

the set of SSBs,

PDCCHs associated with scheduling remaining minimum system information associated with the set of SSBs, RACH messages associated with the set of SSBs, or PDCCHs associated with scheduling RACH responses for the RACH messages associated with the set of SSBs.

17. The method of claim 14, wherein a number of bits in the bitmap matches a maximum number of SSBs for a frequency range in which the repeater is operating.

18. The method of claim 14, wherein a number of bits in the bitmap matches a number of SSBs actually transmitted by the base station.

19. The method of claim 14, wherein the bitmap is a compressed bitmap such that a number of bits in the bitmap is less than a number of SSBs actually transmitted by the base station.

20. The method of claim 14, wherein the configuration information includes a beamforming configuration.

21. The method of claim 14, wherein the configuration information is transmitted in one of:

a special-purpose control signal associated with configuring involvement of repeaters in access procedures, or a common-purpose control signal that includes an indication that the common-purpose control signal is associated with configuring involvement of the repeater in the access procedure.

22. The method of claim 14, wherein the configuration information is transmitted in a common-purpose control signal that includes an indication that the common-purpose control signal is associated with configuring involvement of the repeater in the access procedure.

23. A repeater for wireless communication, comprising:

one or more memories; and one or more processors coupled to the one or more memories, the one or more processors configured to:

receive configuration information associated with configuring involvement of the repeater in an access procedure;

wherein the configuration information includes a bitmap comprising a set of bits, wherein a bit of the set of bits indicates whether to forward signals in resources associated with a synchronization signal block (SSB) of a set of SSBs and at least one of:

physical downlink control channels (PDCCHs) associated with scheduling remaining minimum system information associated with the SSB, random access channel (RACH) messages associated with the SSB, or PDCCHs associated with scheduling RACH responses for the RACH messages associated with the SSB;

receive a signal associated with the access procedure from a first wireless communication device; and forward the signal associated with the access procedure to a second wireless communication device based at least in part on the configuration information.

24. The repeater of claim 23, wherein a number of bits in the bitmap matches a maximum number of SSBs for a frequency range in which the repeater is operating.

25. The repeater of claim 23, wherein the configuration information includes a beamforming configuration.

26. A base station for wireless communication, comprising:

one or more memories; and one or more processors coupled to the one or more memories, the one or more processors configured to:

determine configuration information associated with configuring involvement of a repeater in an access procedure when forwarding a signal, received from a first wireless communication device, to a second wireless communication device, wherein the configuration information includes a bitmap comprising a set of bits, wherein a bit of the set of bits indicates whether to forward signals in resources associated with a synchronization signal block (SSB) of a set of SSBs and at least one of:

physical downlink control channels (PDCCHs) associated with scheduling remaining minimum system information associated with the SSB, random access channel (RACH) messages associated with the SSB, or PDCCHs associated with scheduling RACH responses for the RACH messages associated with the SSB; and transmit the configuration information associated with configuring involvement of the repeater in the access procedure.

27. The repeater of claim 23, wherein the other information associated with the access procedure is received via at least one of:

a system information block, or a radio resource control message.

28. The repeater of claim 23, wherein the configuration information includes an indication of whether the repeater is to forward signals in resources associated with at least one of:

the set of SSBs,

PDCCHs associated with scheduling remaining minimum system information associated with the set of SSBs, RACH messages associated with the set of SSBs, or PDCCHs associated with scheduling the RACH responses for the RACH messages associated with the set of SSBs.

29. The repeater of claim 28, wherein the indication is carried in a single bit.

30. The repeater of claim 28, wherein the indication is carried in the bitmap.

* * * * *